(12) United States Patent
Jin et al.

(10) Patent No.: US 12,725,874 B2
(45) Date of Patent: Sep. 1, 2026

(54) BATTERY, AND ELECTRICAL DEVICE

(71) Applicant: CONTEMPORARY AMPEREX TECHNOLOGY CO., LIMITED, Ningde (CN)

(72) Inventors: Haizu Jin, Ningde (CN); Weiqing Ye, Ningde (CN); Fengsheng Han, Ningde (CN); Manyi Guo, Ningde (CN); Ting Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/289,084

(22) Filed: Aug. 3, 2025

(65) Prior Publication Data

US 2025/0364663 A1 Nov. 27, 2025

Related U.S. Application Data

(63) Continuation of application No. PCT/CN2023/135499, filed on Nov. 30, 2023.

(30) Foreign Application Priority Data

May 8, 2023 (CN) ........................ 202310511054.3

(51) Int. Cl.
*H01M 50/249* (2021.01)
*H01M 10/613* (2014.01)
(Continued)

(52) U.S. Cl.
CPC ....... *H01M 50/249* (2021.01); *H01M 10/613* (2015.04); *H01M 10/625* (2015.04);
(Continued)

(58) Field of Classification Search
CPC ............. H01M 10/653; H01M 50/209; H01M 50/289; H01M 50/291; H01M 50/293;
(Continued)

(56) References Cited

U.S. PATENT DOCUMENTS

2004/0137323 A1* 7/2004 Sato ...................... H01M 50/24 429/185
2012/0189902 A1* 7/2012 Kim .................... H01M 50/209 429/159
(Continued)

FOREIGN PATENT DOCUMENTS

CN 102623739 A 8/2012
CN 207896611 U * 9/2018
(Continued)

OTHER PUBLICATIONS

Machine translation of Wang et al. CN215342871U (Year: 2021).*
(Continued)

*Primary Examiner* — Basia A Ridley
*Assistant Examiner* — Julia Marie Fehr
(74) *Attorney, Agent, or Firm* — K&L Gates LLP

(57) ABSTRACT

The present application discloses a battery and an electric device, the battery includes a plurality of first battery cells, each first battery cell includes a plurality of side walls, the plurality of side walls include a first side wall and a second side wall connected to each other and forming an included angle, the first side wall is the side wall of the first battery cell with the largest area, each first battery cell is disposed opposite to at least one first side wall and at least one second side wall in a plurality of adjacent first battery cells, and two oppositely disposed first side walls of adjacent first battery cells are disposed in a staggered manner.

20 Claims, 13 Drawing Sheets

(51) Int. Cl.

| | |
|---|---|
| ***H01M 10/625*** | (2014.01) |
| ***H01M 10/643*** | (2014.01) |
| ***H01M 10/647*** | (2014.01) |
| ***H01M 10/653*** | (2014.01) |
| ***H01M 50/209*** | (2021.01) |
| ***H01M 50/213*** | (2021.01) |
| ***H01M 50/242*** | (2021.01) |
| ***H01M 50/293*** | (2021.01) |
| ***H01M 50/503*** | (2021.01) |
| ***H01M 50/507*** | (2021.01) |

(52) U.S. Cl.

CPC ....... *H01M 10/643* (2015.04); *H01M 10/647* (2015.04); *H01M 10/653* (2015.04); *H01M 50/209* (2021.01); *H01M 50/213* (2021.01); *H01M 50/242* (2021.01); *H01M 50/293* (2021.01); *H01M 50/503* (2021.01); *H01M 50/507* (2021.01)

(58) Field of Classification Search

CPC ............. H01M 50/267; H01M 50/503; H01M 50/249; H01M 50/242; H01M 50/213; H01M 50/507; H01M 10/613; H01M 10/625; H01M 10/643; H01M 10/647

See application file for complete search history.

(56) References Cited

U.S. PATENT DOCUMENTS

| | | | | |
|---|---|---|---|---|
| 2020/0203686 A1 | | 6/2020 | Park et al. | |
| 2021/0265679 A1 | * | 8/2021 | Wang .................. | H01M 50/209 |
| 2023/0092785 A1 | * | 3/2023 | Caulk ................. | H01M 50/204<br>429/158 |
| 2024/0055698 A1 | * | 2/2024 | Chen ................ | H01M 10/6572 |

FOREIGN PATENT DOCUMENTS

| | | | | | |
|---|---|---|---|---|---|
| CN | 210403848 U | | 4/2020 | | |
| CN | 113871773 A | | 12/2021 | | |
| CN | 215342871 U | * | 12/2021 | | |
| CN | 115775953 A | * | 3/2023 | .......... | H01M 50/209 |
| JP | 2015018644 A | | 1/2015 | | |
| KR | 20180138416 A | * | 12/2018 | .......... | H01M 10/653 |
| KR | 20230052051 A | * | 4/2023 | .......... | H01M 50/204 |
| WO | WO-2024113461 A1 | * | 6/2024 | .......... | H01M 50/209 |

OTHER PUBLICATIONS

Machine translation of Ma et al. CN2007896611U (Year: 2018).*

Machine translation of Park et al. KR20230052051A (Year: 2023).*

Machine translation of WO-2024113461-A1 Xi et al. (Year: 2024).*

GNFortune, What is a Battery Bus Bar?, https://www.newenergy-gn.com/news/74/, updated Sep. 17, 2025. (Year: 2025).*

Machine translation of CN-215342871-U Wang et al. (Year: 2021).*

Machine translation of CN-207896611-U Ma et al. (Year: 2018).*

Machine translation of KR-20230052051-A Park (Year: 2023).*

Machine translation of KR-20180138416-A Ahn et al. (Year: 2018).*

Machine translation of Xi et al. WO-2024113461-A1 (Year: 2024).*

International Search Report in the international application No. PCT/CN2023/135499, mailed on Feb. 20, 2024, 5 pages with English translation.

Written Opinion of the International Search Authority in the international application No. PCT/CN2023/135499, mailed on Feb. 20, 2024, 6 pages with English translation.

Extended European Search Report, mailed Mar. 27, 2026, for corresponding European Patent Application Serial No. 23936442.5.

* cited by examiner

BATTERY, AND ELECTRICAL DEVICE

CROSS-REFERENCE TO RELATED APPLICATIONS

The present application is a continuation of PCT Application No. PCT/CN2023/135499, filed on Nov. 30, 2023, which is based on and claims priority to Chinese Patent Application No. 202310511054.3, filed on May 8, 2023, the entire disclosure of which is incorporated herein by reference.

TECHNICAL FIELD

The present application relates to the field of batteries, and in particular, to a battery and an electric device.

BACKGROUND

Energy conservation and emission reduction are the key to the sustainable development of the automotive industry, and electric vehicles have become an important component of the sustainable development of the automotive industry due to energy saving and environment protection advantages thereof. For electric vehicles, a battery technology is an important factor for the development thereof.

In a process of using a battery by charging or discharging, the battery generates heat to cause its temperature rise, affecting the performance and safety of the battery.

SUMMARY

In view of the above problems, the present application provides a battery and an electric device, and can alleviate the problem that a temperature rise in a process of using a battery affects the performance and use safety of the battery.

In a first aspect, the present application provides a battery including a plurality of first battery cells, each first battery cell includes a plurality of side walls, the plurality of side walls include a first side wall and a second side wall connected to each other and forming an included angle, the first side wall is a side wall of the first battery cell having the largest area, each first battery cell is disposed opposite to at least one first side wall and at least one second side wall in a plurality of adjacent first battery cells, and two oppositely disposed first side walls of adjacent first battery cells are disposed in a staggered manner.

In the technical solution of the embodiment of the present application, each first battery cell is disposed opposite to at least one first side wall and at least one second side wall in a plurality of adjacent first battery cells, and two oppositely disposed first side walls of adjacent first battery cells are disposed in a staggered manner. This design makes a smaller contact area of two adjacent first battery cells and an incompletely blocked first side wall, thus in a process of using a battery by charging or discharging, the first battery cell can diffuse heat faster through the first side wall having the largest area to reduce a temperature rise of a battery, and when a certain first battery cell is subjected to thermal runaway, heat diffusion between two adjacent first battery cells can be reduced, that is, it aims to suppress heat diffusion, thereby increasing the performance and use safety of the battery.

In some embodiments, a plurality of rows of battery units are included, each row of the battery units includes a plurality of first battery cells, any two adjacent first battery cells in the battery units in a same row are disposed in an intersected manner to define an opening space, and two first battery cells disposed in an intersected manner in another row of the first battery cells are disposed within the opening space.

In some embodiments, by disposing any two adjacent first battery cells, that are intersected, in the battery units in the same row to define an opening space, and disposing two first battery cells in another row, that are disposed in an intersected manner, within the opening space, an installation space can be fully used to increase its utilization rate, and thus, it is facilitated to achieve a miniaturized design of a battery, and it is enabled that arrangement of the plurality of rows of battery units is more compact, facilitating to increase the energy density of the battery.

In some embodiments, the second side wall of one of the first battery cells disposed in an intersected manner is parallel to the first side wall of the other first battery cell.

In the battery in the embodiment of the present application, in the two first battery cells disposed in an intersected manner, a second side wall of one first battery cell is parallel to a first side wall of the other one first battery cell, so that the two first battery cells disposed in an intersected manner can be connected in an abutting manner, and thus, the two first battery cells disposed in an intersected manner are arranged more compactly.

In some embodiments, the adjacent first battery cells are in thermal connection.

In this way, by disposing adjacent first battery cells in thermal connection to enable that the adjacent first battery cells can achieve better heat conduction therebetween, temperature equalizing is enabled for a plurality of first battery cells to prevent an excessively high temperature of a local first battery, and heat from first battery cells can easily dissipate more quickly, thereby increasing the performance and use safety of the battery.

In some embodiments, the first battery cells at row ends of adjacent rows are electrically connected by a busbar, and at least a part of the busbar is obliquely disposed relative to the first side wall of the first battery cell.

In the battery in the embodiment of the present application, by disposing the first battery cells at row ends of adjacent rows electrically connected by a busbar, it is facilitated to achieve electrical connection between a plurality of rows of battery units, so that the plurality of rows of battery units can be formed into a whole, thereby reducing the difficulty for electrically connecting the plurality of rows of battery units.

Here, at least a part of the busbar is obliquely disposed relative to the first side wall of the first battery cell, so that the disposing manner for at least a part of the busbar can better satisfy the disposing manner that two first side walls of adjacent first battery cells are disposed opposite to each other in a staggered manner; and in this way, the span of the busbar is not excessively long to easily avoid blocking an explosion-proof valve of the first battery cell by the busbar, a shorter busbar can reduce an overcurrent path of a busbar, effectively improving heat generated when the busbar is subjected to continuous overcurrent, and also, can effectively alleviate expansion force of the first battery cell to the first side wall, avoiding breakage of the busbar to facilitate to prolong the service life of the busbar.

In some embodiments, the busbar includes a transition portion and two electrical connection portions, two ends of the transition portion are connected to the two electrical connection portions, respectively, an extension direction of the transition portion has an included angle with both the first side wall and the second side wall, and the two electrical connection portions are electrically connected to the two first battery cells, respectively.

In the battery in the embodiment of the present application, two ends of the transition portion are connected to the two electrical connection portions, respectively, and the two electrical connection portions are electrically connected to the two first battery cells, respectively, so it is facilitate to achieve electrical connection of two rows of battery units; and an extension direction of the transition portion has an included angle with both the first side wall and the second side wall, so that the transition portion can alleviate the expansion force of the first battery cell on the first side wall and the second side wall; and the transition portion is not directly opposite to the first side wall and second side wall, so that when the first battery cell expands, the transition portion has an angle relative to the direction of the expansion force to reduce the force on the transition portion, so as to avoid direct-force-loading breakage of the transition portion, facilitating to prolong the service life of the busbar.

In some embodiments, the transition portion is provided with a stretch-deformable buffer portion.

In this way, by providing the buffer portion, the stress generated when the first battery cell expands can be alleviated to alleviate a pulling force applied to the busbar when the first battery cell expands, facilitating to prolong the service life of the busbar, and enabling small deformation generated after the battery expands, so that the deformation of the battery is controllable to facilitate to increase the safety factor of the battery.

In some embodiments, the stretch-deformable buffer portion is connected between each electrical connection portion and the transition portion.

In this way, two buffer portion can respectively alleviate the stress generated when a corresponding first battery cell expands to reduce a pulling force applied to the busbar by expanding the first battery cell, facilitating to prolong the service life of the busbar, and enabling small deformation generated after the battery expands, so that the deformation of the battery is controllable to facilitate to increase the safety factor of the battery.

In some embodiments, the buffer portion includes at least one bending portion having an opening.

In this way, the bending portion having an opening can be used to alleviate the stress generated when the first battery cell expands to reduce a pulling force applied to the busbar by expanding the first battery cell, facilitating to further prolong the service life of the busbar.

In some embodiments, the transition portion is provided with a stiffener which is a conductive-material member.

In the battery in the embodiment of the present application, by disposing the stiffener, it is facilitated to enhance the structural strength of the transition portion to avoid its breakage problem, and the stiffener is a conductive-material member, so that the stiffener can also has an effect of electrically connecting two adjacent battery units to enhance the overcurrent capability of the busbar.

In some embodiments, the transition portion and the stiffener are stacked.

In this way, the stiffener does not occupy too much installation space to facilitate to realize a miniaturization design of a busbar, and easily to increase an overcurrent area of the busbar at the transition portion, thereby further reducing the temperature rise caused when the busbar has overcurrent.

In some embodiments, the battery includes a box, a plurality of rows of battery units are disposed in the box, each row of the battery units includes a plurality of first battery cells, gaps are disposed between the plurality of rows of battery units and an inner wall of the box, and the gaps are filled with a filler.

In the battery in the embodiment of the present application, by disposing the filler in the gap between the plurality of rows of battery units and the inner wall of the box, the battery units in the box can be fixed to enhance the stability of the battery units in the box, and the battery units do not rigidly contact the inner wall of the box, to avoid damage caused by collision between the battery units and the inner wall of the box, and when a force is applied to an outer side of the box, the filler can partially absorb a collision force, to reduce a collision force applied to the battery units.

In some embodiments, the filler includes a thermally-conductive member thermally connected to the opposite side wall and/or second side wall.

In this way, heat generated by the battery unit can be transferred to the box by the thermally-conductive member, so that it is easy to increase a heat dissipation path of the battery unit to increase a heat dissipation capability of the battery unit, further reducing the temperature rise of the battery in use.

In some embodiments, the filler includes a monitor for detecting an operating state of each first battery cell.

In this way, the operation state of the first battery cell may be monitored in real time by the monitor to easily control the state of the first battery cell, so that a faulty first battery cell can be found in time, thereby reducing a risk of a safety problem of a battery.

In some embodiments, the filler includes a second battery cell electrically connected to the first battery cell.

In this way, by disposing the second battery cell in the gap between the battery unit and the inner wall of the box, the gap between the battery unit and the inner wall of the box is effectively used, so that the space utilization rate of the battery is increased, facilitating to increase the volume energy density and weight energy density of the battery.

In some embodiments, the second battery cell is a cylindrical battery.

Therefore, the second battery cell can better use the gap between the plurality of rows of battery units and the inner wall of the box, facilitating to increase the energy density of the battery.

In some embodiments, there are a plurality of second battery cells, and the plurality of second battery cells and the plurality of first battery cells are arranged into a rectangular battery module. Therefore, the second battery cell and the first battery cell can better adapt to the shape of the box after being arranged.

In a second aspect, the present application provides an electric device comprising the battery in the above embodiments, the battery being used to supply electric energy.

The above description is merely an overview of the technical solutions of the present application. For a clearer understanding of the technical means of the present application, the present application can be carried out in accordance with the content of the description, and in order to make the above and other objectives, characteristics, and advantages of the present application apparent and comprehensible, specific embodiments of the present application are described below.

DESCRIPTION OF DRAWINGS

Various other advantages and benefits will become clear to a person of ordinary skill in the art upon reading the detailed description of the preferred implementations below.

The accompanying drawings are used only for the purpose of illustrating the preferred implementations and are not to be construed as limitations on the present application. Moreover, the same reference numerals are used to denote the same components throughout the accompanying drawings. In the accompanying drawings.

Figure 1:
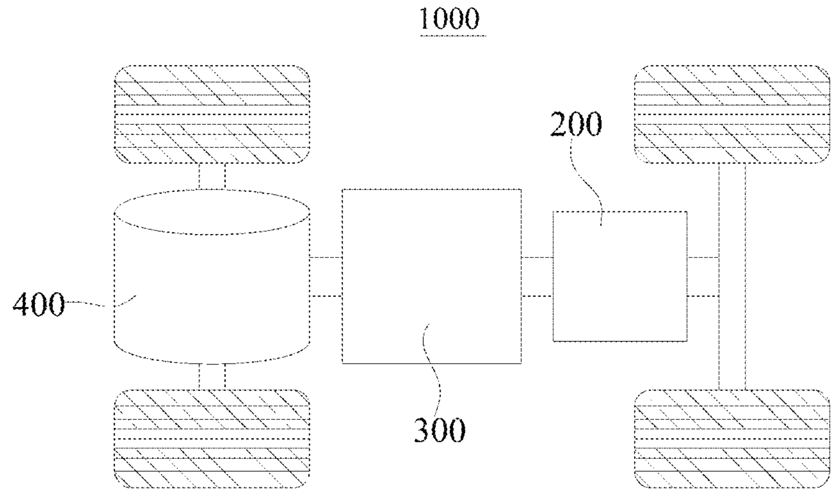
FIG. 1 is a schematic diagram of a structure of a vehicle according to some embodiments of the present application.

Reference numerals in specific implementations are as follows:

electric device 1000;

battery 200, controller 300, and motor 400;

first direction X, second direction Y, and third direction Z;

first battery cell 10, side wall 11, first side wall 111, second side wall 112, and opening space 12;

battery unit 10A;

box 30, accommodating chamber 30*a*, second part 31, and second part 32;

partition plate 40;

busbar 50, transition portion 51, and electrical connection portion 52;

buffer portion 53, opening 530, bending portion 531, and stiffener 54;

filler 60, second battery cell 61, monitor 62, and thermally-conductive member 63;

thermally-conductive stiffener 70, cavity 70*a*, and thermally-conductive side wall 71;

support structure 80, heat-absorbing-material member 90, heat exchange plate 100, heat exchange channel 100*a*, and insert 110.

DESCRIPTION OF EMBODIMENTS

Embodiments of the technical solutions of the present application are described in detail below with reference to the drawings. The following embodiments are only used to more clearly illustrate the technical solutions of the present application, and thus are used as examples only, and are not intended to limit the protection range of the present application.

Unless defined otherwise, all technical and scientific terms used herein have the same meaning as commonly understood by a person skilled in the art to which the present application belongs; the terms used herein are used for describing particular embodiments only and are not intended to limit the present application; and the terms “comprising”, “including”, and “having” and any variations thereof in the description, claims and the above drawings of the present application are intended to cover non-exclusive inclusion.

In the description of the embodiments of the present application, the technical terms “first”, “second”, and the like are used only for distinguishing between different objects, but cannot be construed to indicate or imply relative importance or implicitly indicate the number, specific order, or primary/secondary relationship of indicated technical features. In the description of the embodiments of the present application, “a plurality of” means two or more unless specifically defined otherwise.

Reference to “an embodiment” herein means that a particular feature, structure, or characteristic described with reference to the embodiment can be included in at least one embodiment of the present application. The phrase in various places in the description does not necessarily all refer to the same embodiment, or a separate or alternative embodiment mutually exclusive of other embodiments. It is explicitly and implicitly understood by a person skilled in the art that the embodiments described herein may be combined with other embodiments.

In the description of the embodiments of the present application, the term “and/or” merely describes an association relationship of associated objects, indicating that three relationships may exist, for example, A and/or B may mean that A exists alone, A and B exist simultaneously, or B exists alone. In addition, the character “/” herein generally indicates that associated objects are in a “or” relationship.

In the description of the embodiments of the present application, the term “a plurality of” means two or more (including two), and similarly, the term “a plurality of groups” means two or more groups (including two groups), and the term “a plurality of pieces” means two or more pieces (including two pieces).

In the description of the embodiments of the present application, an orientation or positional relationship indicated by technical terms “center”, “longitudinal”, “transverse”, “length”, “width”, “thickness”, “up”, “down”, “front”, “back”, “left”, “right”, “vertical”, “horizontal”, “top”, “bottom”, “inner”, “outer”, “clockwise”, “counterclockwise”, “axial”, “radial”, “circumferential”, and the like is an orientation or positional relationship shown based on the accompanying drawings, is intended only to facilitate the description of the embodiments of the present application and simplification of the description rather than indicating or implying that an apparatus or an element indicated must have a specific orientation, or be constructed and operated in a specific orientation, and therefore is not intended to be construed as a limitation to the embodiments of the present application.

In the description of the embodiments of the present application, unless otherwise specified and defined explicitly, the technical terms "mounted", "connected to", "connect", "fixed", and the like should be understood in a broad sense, which, for example, may be understood as fixed connection, detachable connection or integral connection, may be understood as mechanical connection, or electrical connection, or may be understood as direct connection, indirect connection via an intermediate medium, or communication between the interiors of two elements or interactions between two elements. A person of ordinary skill in the art may understand the specific meanings of the above terms in the embodiments of the present application according to specific situations.

At present, in view of the development of the market, the use of power batteries is becoming increasingly more widespread. Power batteries are used not only in energy storage power systems such as hydropower, thermal power, wind power, and solar power plants, but also in electric tools such as electric bicycles, electric motorcycles, and electric vehicles, as well as military equipment, aerospace, and many other fields. As an application field of power batteries continues to expand, a market demand for power batteries continues to increase.

The applicant has noticed that a battery generates heat in its charging and discharging processes, and the heat generated by the battery causing its temperature rise. In particular, side walls (the first side wall in the present application) with the largest area of two adjacent first battery cells in a battery are disposed directly opposite to each other, and that affects heat conduction between the two adjacent first battery cells, causing an excessive temperature rise of the battery, so that the performance and use safety of the battery are adversely affected. For example, an excessive temperature rise of a battery may cause a decrease in its charging or discharging efficiency to reduce the service life of the battery. When the battery has the temperature rise and cannot dissipate heat in time, risks may be triggered for the battery, such as, thermal runaway, etc. Further, when a certain first battery cell is subjected to thermal runaway, thermal diffusion may occur between two adjacent first battery cells to affect the safety of the battery.

To alleviate a temperature rise problem of a battery, the applicant has found by research that side walls having largest areas of two adjacent first battery cells in a battery may be disposed in a staggered manner by a design to reduce heat conduction between the two adjacent first battery cells. Specifically, it is to reduce the contact area between the two adjacent first battery cells, and the first side wall is not completely blocked, so that the temperature rise of the battery is reduced, and the heat diffusion between the two adjacent first battery cells is reduced, thereby increasing the performance and use safety of the battery.

Based on the above considerations, in order to solve a temperature rise problem of a battery during its use, the applicant, by deep research, designs a battery including a plurality of first battery cells, wherein each first battery cell is disposed opposite to at least one first side wall and at least one second side wall of a plurality of adjacent first battery cells, and two oppositely disposed first side walls of adjacent first battery cells are disposed in a staggered manner.

In this battery, each first battery cell has a smaller contact area with two adjacent first battery cells and the first side wall is incompletely blocked, so that in a process of using the battery by charging or discharging, the first battery cell can diffuse heat faster through the first side wall having the largest area to reduce the temperature rise of the battery.

As the batter is used, when a certain first battery cell is subjected to thermal runaway, since two oppositely disposed first side walls of adjacent first battery cells are disposed in a staggered manner, that is, two oppositely disposed first side walls of adjacent first battery cells are not disposed directly opposite to each other, it is facilitated to reduce the heat diffusion between the two adjacent first battery cells, thereby increasing the performance and use safety of the battery.

Given increasing requirements for battery performance and use safety, the battery in the present application can improve performance and use safety of a battery by adjusting a manner to arrange the first battery cells. For example, generally, the position of the side wall having the largest area of a first battery cell (that is, the first side wall in the present application), has more severe expansion than positions of other side walls, with also a larger expansion force. In this case, two oppositely disposed first side walls of adjacent first battery cells are disposed in a staggered manner, so that squeezing between the two oppositely disposed first side walls can be reduced. In this way, it is possible to reduce the expansion force at the two oppositely disposed first side walls of the adjacent first battery cells, to increase the use safety of the battery.

As the first battery cell is further used and the expansion force is further increased, a certain first battery cell is subject to thermal runaway, and heat diffusion between two adjacent first battery cells is relatively small, thereby further increasing the use safety of the battery.

The battery disclosed in the embodiments of the present application can be used in an electric device using a battery as a power supply or various energy storage systems using a battery as an energy storage component. The electric device can be, but is not limited to, a mobile phone, a tablet computer, a notebook computer, an electric toy, an electric tool, a battery-powered vehicle, an electric vehicle, a ship, a spacecraft, and the like. The electric toy may include a stationary or mobile electric toy, such as a game machine, an electric car toy, an electric ship toy, an electric airplane toy, and the like, and the spacecraft may be an airplane, a rocket, a space shuttle, a spaceship, etc.

For ease of description, the following embodiments are described by taking, as an example, an electric device 1000, as a vehicle, in an embodiment of the present application.

Refer to FIG. 1. FIG. 1 is a schematic structural diagram of a vehicle according to some embodiments of the present application. The vehicle may be a fuel vehicle, a gas vehicle, or a new energy vehicle, and the new energy vehicle may be a battery electric vehicle, a hybrid vehicle, or a range-extended electric vehicle. Inside the vehicle, a battery 200 is provided, which may be provided at the bottom, head, or tail of the vehicle. The battery 200 may be used to power the vehicle, for example, the battery 200 may be used as an operating power source of the vehicle. The vehicle may further include a controller 300 and a motor 400, and the controller 300 is used to control the battery 200 to power the motor 400, for example, for a working power requirement for the vehicle during starting, navigating, and driving the vehicle.

In some embodiments of the present application, the battery 200 may be used not only as the operating power source of the vehicle, but also as a driving power source of the vehicle, instead of or partially instead of fuel or natural gas to provide driving power for the vehicle.

Figure 2:
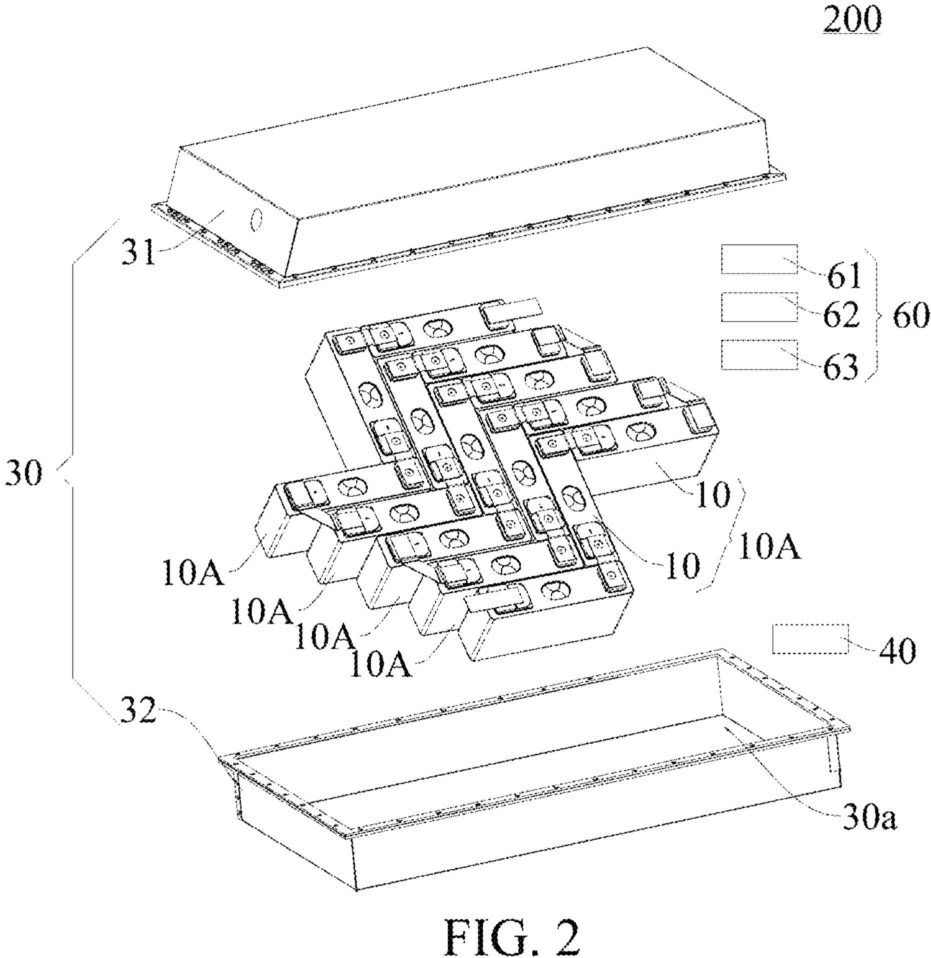
FIG. 2 is a schematic diagram of a decomposed structure of a battery according to some embodiments of the present application.

Referring to FIG. 2, FIG. 2 is an exploded view of a battery 200 provided by some embodiments of the present application. The battery 200 includes a box 30 and a first battery cell 10. The first battery cell 10 is accommodated in the box 30. Here, the box 30 is used for providing an accommodation space for the first battery cell 10, and the box 30 may have various structures. In some embodiments, referring to FIG. 2, the box 30 may include a first part 31 and a second part 32, and the first part 31 and the second part 32 fit to each other to define an accommodation space for accommodating the battery cell 10. The second part 32 may be a hollow structure with an opening at one end, the first part 31 may be a plate-shaped structure, and the first part 31 covers an opening side of the second part 32, so that the first part 31 and the second part 32 jointly define the accommodation space. The first part 31 and the second part 32 each may be a hollow structure with an opening at one end, and an opening side of the first part 31 covers an opening side of the second part 32. Of course, the box 30 formed by the first part 31 and the second part 32 may be in various shapes such as cylinder, cuboid, and the like.

In the battery 200, a plurality of first battery cells 10 may be provided, and the plurality of first battery cells 10 may be subjected to series connection, parallel connection, or series-parallel connection. The series-parallel connection means that the plurality of first battery cells 10 are subjected to both series connection and parallel connection. The plurality of first battery cells 10 may be subjected to series connection, parallel connection, or series-parallel connection directly, and then an integration formed by the plurality of first battery cells 10 is accommodated in the box 30. Certainly, the battery 200 may be alternatively a battery-200 module formed by integrating the plurality of first battery cells 10 by series connection, parallel connection, or series-parallel connection, and then a plurality of battery modules 200 are integrated by series connection, parallel connection, or series-parallel connection, and accommodated in the box 30. The battery 200 may further include other structures. For example, the battery 200 may further include a busbar 50 for implementing an electrical connection between the plurality of first battery cells 10.

Here, each first battery cell 10 may be a secondary battery 200 or a primary battery 200, or may be a lithium-sulfur battery 200, a sodium-ion battery 200, or a magnesium-ion battery 200, but is not limited thereto. The first battery cell 10 may be in the shape of cylinder, flat body, cuboid, etc.

Figure 3:
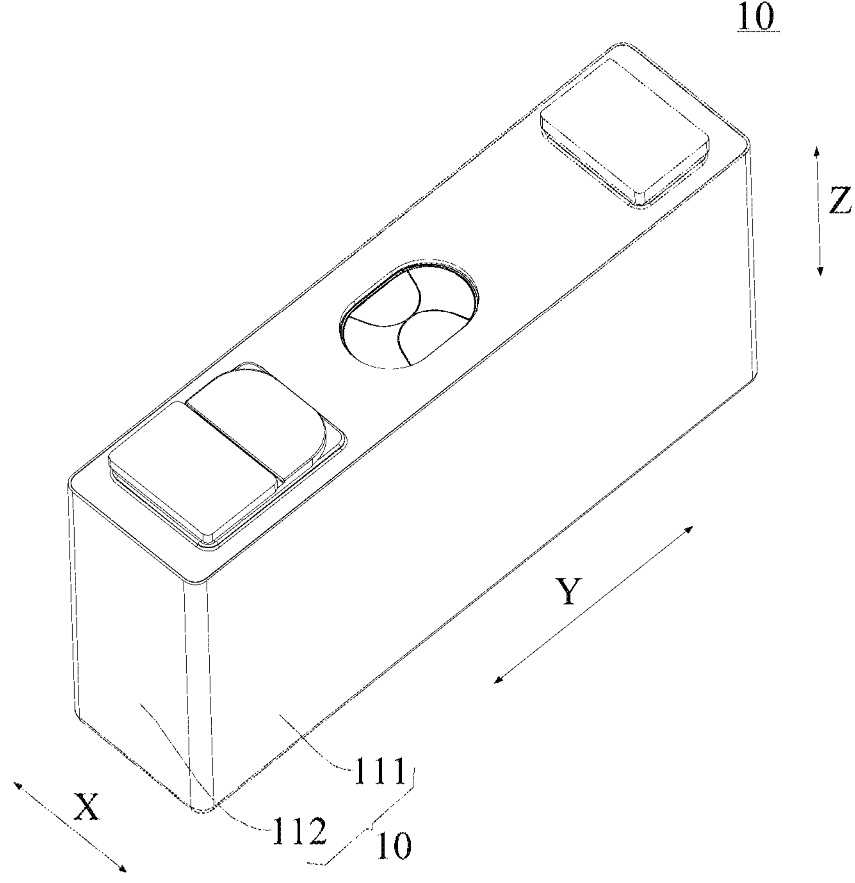
FIG. 3 is a schematic diagram of a structure of a first battery cell according to some embodiments of the present application.

Referring to FIG. 3, FIG. 3 is a schematic diagram of a structure of a first battery cell 10 according to some embodiments of the present application. The first battery cell 10 refers to a minimum unit constituting the battery 200. Exemplarily, the first battery cell 10 includes an end cap, a case, an electrode assembly, and other functional components.

The end cap is a component that covers the opening of the case to insulate an internal environment of the first battery cell 10 from an external environment. Without limitation, the shape of the end cap may adapt to the shape of the case to fit the case. Alternatively, the end cap may be made of a material with certain hardness and strength (e.g., aluminum alloy). As such, the end cap is less prone to deformation under compressive impact, thereby enabling the first battery cell 10 to have higher structural strength and improved safety performance. The end cap may be provided with a functional component such as an electrode terminal. The electrode terminal may be configured to be electrically connected to the electrode assembly for outputting or inputting electrical energy of the first battery cell 10. In some embodiments, a pressure relief mechanism for relieving internal pressure may be further disposed on the end cap when the internal pressure or temperature of the first battery cell 10 reaches a threshold value. The end cap may be made of various materials, such as copper, iron, aluminum, stainless steel, aluminum alloy, plastic, etc. The embodiments of the present application impose no special limitations thereto. In some embodiments, an insulation member may be further disposed on an inner side of the end cap, and the insulation member may be used to isolate an electrical connection component in the case from the end cap to reduce a risk of a short circuit. For example, the insulation member may be plastic, rubber, etc.

The case is a component configured to cooperate with the end cap to form an internal environment of the first battery cell 10, where the formed internal environment may be used to accommodate the electrode assembly, an electrolyte, and other components. The case and the end cap may be separate members, and an opening may be provided in the case, and the inner environment of the first battery cell 10 may be formed by closing the end cap at the opening. Without limitation, the end cap and the case may also be integrated. Specifically, the end cap and the case may form a joint connection surface before other components are fitted into the case, and then the end cap is enabled to cover the case when an interior of the case needs to be enclosed. The case may be in various shapes and various dimensions, such as cuboid, cylinder, hexagonal prism, and the like. Specifically, the shape of the case may be determined based on a specific shape and dimension of the electrode assembly. The case may be made of various materials, such as copper, iron, aluminum, stainless steel, aluminum alloy, plastic, and the like. This is not specially limited in the embodiments of the present application.

The electrode assembly is a component in the first battery cell 10 in which an electrochemical reaction occurs. The case may include one or more electrode assemblies 23. The electrode assembly is mainly formed by winding or stacking a positive electrode sheet and a negative electrode sheet, and a separator is generally provided between the positive electrode sheet and the negative electrode sheet. Parts of the positive electrode sheet and the negative electrode sheet with an active material constitute a main body of the electrode assembly, and parts of the positive electrode sheet and the negative electrode sheet with no active material each constitutes a tab. A positive electrode tab and a negative electrode tab may both be located at one end of the main body portion or be located at two ends of the main body portion respectively. During charge-discharge of a battery 200, a positive electrode active substance and a negative electrode active substance react with the electrolyte, and the tab is connected to an electrode terminal to form a current circuit.

According to some embodiments of the present application, referring to FIG. 2, an embodiment of the present application provides a battery 200, including a plurality of first battery cells 10.

Figure 4:
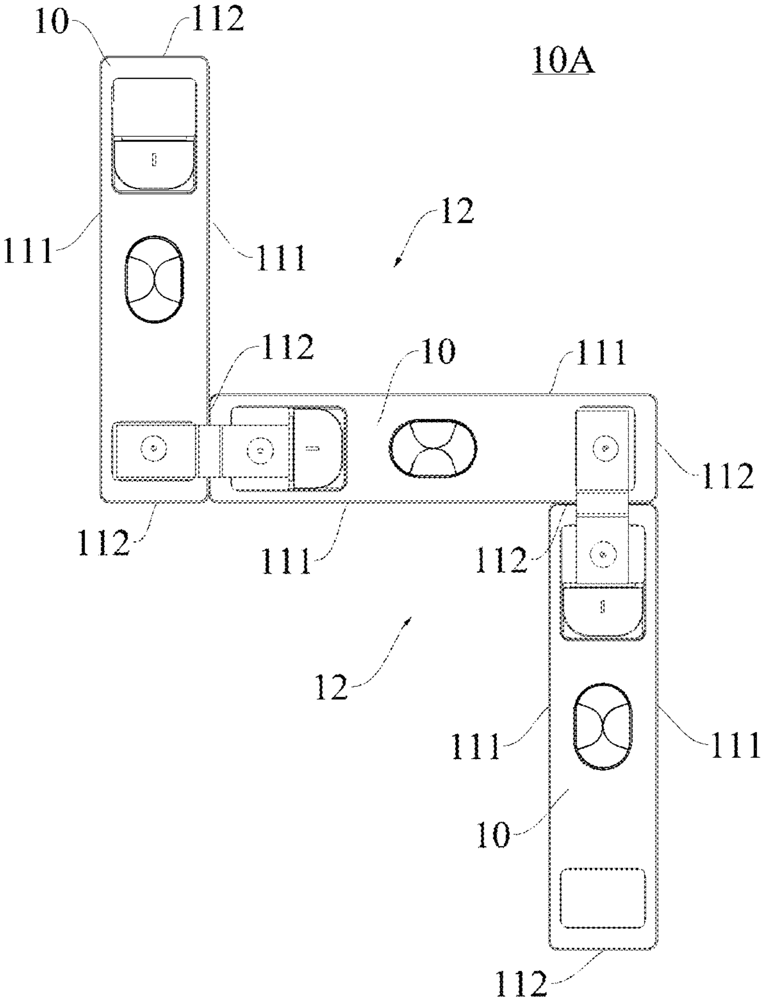
FIG. 4 is a schematic diagram of a structure of a row of battery units according to some embodiments of the present application.
Figure 5:
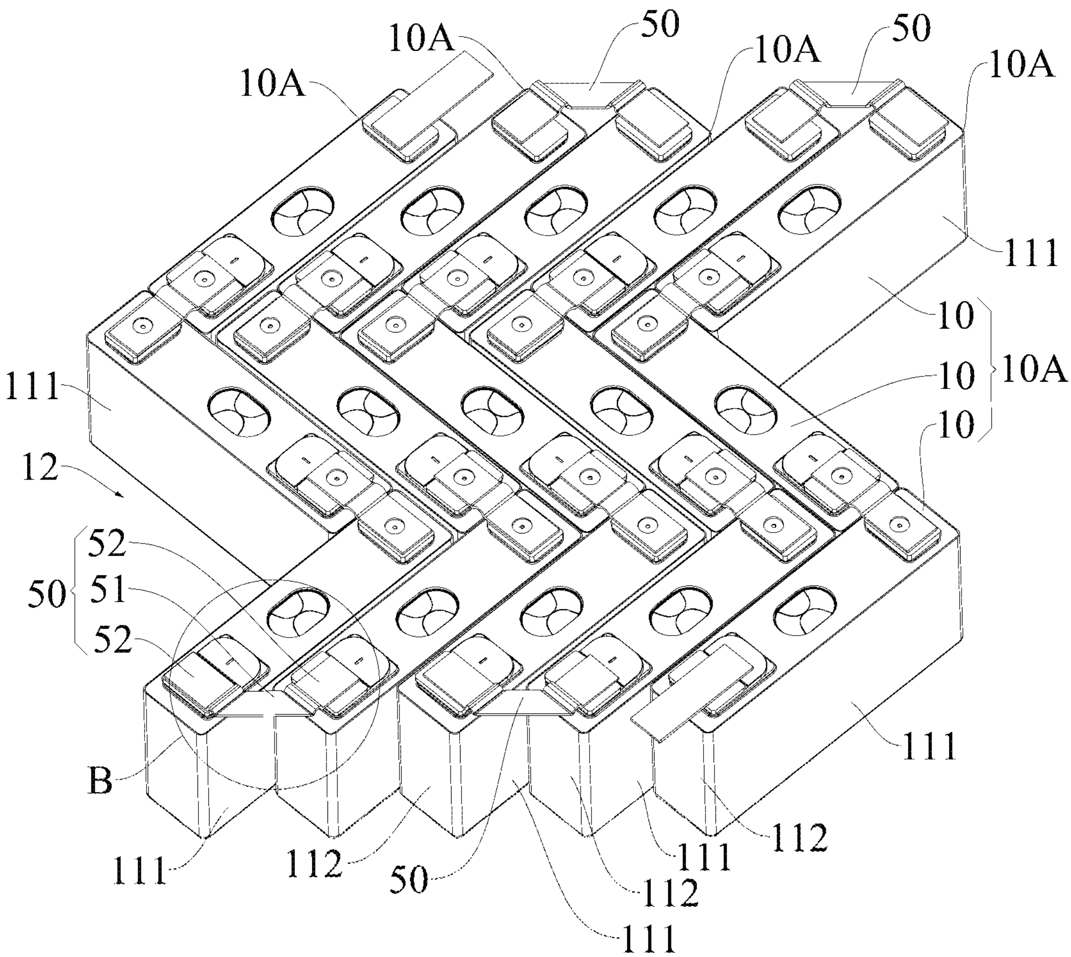
FIG. 5 is a schematic diagram of a structure of a plurality of rows of battery units according to some embodiments of the present application.
Figure 6:
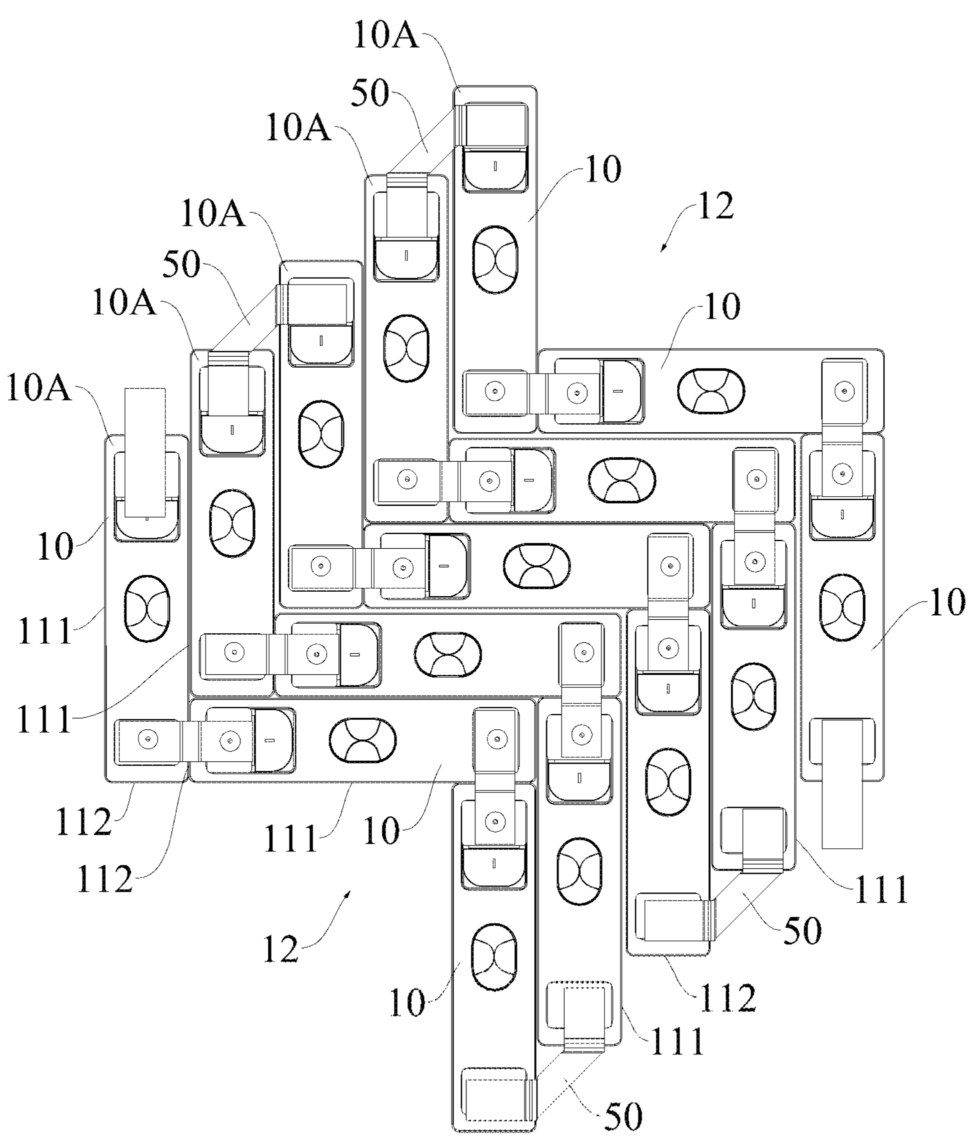
FIG. 6 is a top view of a plurality of rows of battery units shown in FIG. 5.

Referring to FIG. 3, each first battery cell 10 includes a plurality of side walls 11, the plurality of side walls 11 include first side walls 111 and second side walls 112 connected and forming included angles, the first side walls 111 are the side walls 11 of the first battery cell 10 having the largest area, referring to FIG. 4, each first battery cell 10 is disposed opposite to at least one first side wall 111 and at least one second side wall 112 in a plurality of adjacent first battery cells 10, and further referring to FIG. 5 and FIG. 6, two oppositely disposed first side walls 111 of adjacent first battery cells 10 are disposed in a staggered manner.

As shown in FIG. 3, the thickness direction of the first battery cell 10 is a first direction X, the length direction of the first battery cell 10 is a second direction Y, and the height direction of the first battery cell 10 is a third direction Z.

"Side wall 11" refers to the outer wall of the first battery cell 10 parallel to the height direction (the Z direction in FIG. 3). Exemplarily, referring to FIG. 3, the first battery cell 10 may be of a square structure, and the plurality of side walls 11 include the side walls 11 of the first battery cell 10 disposed opposite to each other in the length direction (the Y direction in FIG. 3), and the side walls 11 of the first battery cell 10 disposed opposite to each other in the thickness direction (the X direction in FIG. 3).

Here, the first side walls 111 may be the two side walls 11 of the first battery cell 10 that are oppositely disposed in the thickness direction, and the second side walls 112 may be the two side walls 11 of the first battery cell 10 that are oppositely disposed in the length direction, where the first side walls 111 are the side walls 11 of the first battery cell 10 that have the largest area, that is, the first side walls 111 are "large surfaces" of the first battery cell 10.

"Each first battery cell 10 being disposed opposite to at least one first side wall 111 and at least one second side wall 112 of a plurality of adjacent first battery cells 10" includes, but is not limited to, each first battery cell 10 being disposed directly opposite to or obliquely opposite to at least one first side wall 111 and at least one second side wall 112 of a plurality of adjacent first battery cells 10. Exemplarily, referring to FIG. 4, each first battery cell 10 is disposed directly opposite to at least one first side wall 111 and at least one second side wall 112 of a plurality of adjacent first battery cells 10.

In this way, two adjacent first battery cells 10 are in contact with each other, so that when the first battery cell 10 generates heat, it can be dispersed through other first battery cells 10 in contact with the first battery cell 10 that generates heat, and thus, the first battery cell 10 can disperse heat more quickly, to reduce the temperature rise of the battery 200.

"Two oppositely disposed first side walls 111 of adjacent first battery cells 10 being disposed in a staggered manner" means that, in two adjacent first battery cells 10, one first side wall 111 of one first battery cell 10 and a first side wall 111, disposed opposite to the one first side wall 111, of the other first battery cell 10 are disposed in a staggered manner, where "being disposed in a staggered manner" means that two oppositely disposed first side walls 111 of two adjacent first battery cells 10 do not directly face each other.

Exemplarily, referring to FIG. 5, FIG. 6, FIG. 9 and FIG. 10, the two oppositely disposed first side walls 111 of the adjacent first battery cells 10 are disposed in a staggered manner in the second direction Y (the length direction of the first battery cells 10). In this way, it is facilitated to reduce the heat diffusion between the two adjacent first battery cells 10, thereby increasing the performance and use safety of the battery 200.

In some other embodiments, the two oppositely disposed first side walls 111 of the adjacent first battery cells 10 are disposed in the height direction of the first battery cell 10, which is not limited herein.

It should be noted that, generally, the position of the side wall 11 having the largest area of a first battery cell 10 (that is, the first side wall 111 in the present application) has more severe expansion than positions of other side walls, with also a larger expansion force.

In the present application, the two oppositely disposed first side walls 111 of the adjacent first battery cells 10 are disposed in a staggered manner, so that squeezing between the two oppositely disposed first side walls 111 can be reduced. In this way, it is possible to the expansion force at the two oppositely disposed first side walls 111 of the adjacent first battery cells 10 to increase the use safety of the battery 200, and when a certain first battery cell 10 is subjected to thermal runaway, heat diffusion between two adjacent first battery cells 10 is relatively small, thereby further increasing the use safety of the battery 200.

In the technical solution of the embodiment of the present application, each first battery cell 10 is disposed opposite to at least one first side wall 111 and at least one second side wall 112 in a plurality of adjacent first battery cells 10, and two oppositely disposed first side walls 111 of adjacent first battery cells 10 are disposed in a staggered manner. This design makes a smaller contact area of two adjacent first battery cells 10 and an incompletely blocked first side wall 111, thus in a process of using the battery 200 by charging or discharging, the first battery cell 10 can diffuse heat faster through the first side wall 111 having the largest area to reduce the temperature rise of the battery 200, and when a certain first battery cell 10 is subjected to thermal runaway, heat diffusion between two adjacent first battery cells 10 can be reduced, thereby increasing the performance and use safety of the battery.

According to some embodiments of the present application, a thermally-conductive adhesive layer is disposed between two oppositely disposed first side walls 111 of adjacent first battery cells 10.

Therefore, by disposing the thermally-conductive adhesive layer, it is facilitated to properly increase a heat transfer rate between first battery cells 10 disposed in a staggered manner, so that heat is properly transferred in an operation process of the first battery cell 10, to achieve thermal management on the battery 200.

According to some embodiments of the present application, referring to FIG. 5 and FIG. 6, the battery 200 includes a plurality of rows of battery units 10A.

Referring to FIG. 4, each row of battery units 10A includes a plurality of first battery cells 10, any two adjacent first battery cells 10 in the same row of battery units 10A are disposed in an intersected manner to define an opening space 12, and referring to FIG. 5 and FIG. 6, two first battery cells 10, disposed in an intersected manner, within another row of first battery cells 10 are disposed in the opening space 12.

"Being disposed in an intersected manner" means intersection in extension directions of two adjacent first battery cells 10 of each row of battery units 10A (the length direction of the first battery cells 10), that is, extension directions of two adjacent first battery cells 10 of each row of battery units 10A are not parallel.

Therefore, by disposing any two adjacent first battery cells 10, that are intersected, in the battery units 10A in the same row to define an opening space 12, and disposing two first battery cells 10 in another row, that are disposed in an intersected manner, within the opening space 12 defined by any two adjacent first battery cells 10 in a row that are disposed in an intersected manner, an installation space can be fully utilized to increase its utilization rate, and thus, the miniaturized design of the battery 200 is facilitated, and it is enabled that arrangement of the plurality of rows of battery units 10A is more compact, facilitating to increase the energy density of the battery 200.

Exemplarily, referring to FIG. 4, a row of battery units 10A includes three first battery cells 10, in which any one first battery cell 10 has a length direction intersecting with that of adjacent another first battery cell 10, so that the three first battery cells 10 form an arrangement manner similar to a "Z"-shape.

Further, referring to FIG. 4, the two adjacent first battery cells 10 are disposed in an intersected manner to define an opening space 12, so that when the plurality of battery units 10A are arranged, two first battery cells 10 in another row that are disposed in an intersected manner may be disposed in the opening space 12 defined by any two adjacent first battery cells 10 in a row that are disposed in an intersected manner.

Thus, the installation space can be fully used to increase its utilization rate, the miniaturized design of the battery 200 is facilitated, and it is enabled that arrangement of the plurality of rows of battery units 10A is more compact, facilitating to increase the energy density of the battery 200.

It should be noted that the number of the first battery cells 10 included in one row of battery units 10A above is only for illustration, and first battery cells 10 disposed in a plurality of rows of battery units 10A may have the same number or different numbers, which is not limited herein.

In some embodiments of the present application, a partition plate 40 is provided in the box 30 to define a plurality of accommodating chambers 30*a*, within each of which at least two rows of battery units 10A disposed in a staggered manner are disposed. It can be understood that the battery units 10A disposed in the plurality of accommodating chambers 30*a* may have an equal number or unequal numbers; and the number of the partition plates 40 is one or more.

In the above technical solution, by disposing the partition plate 40 in the box 30 to define the plurality of accommodating chambers 30*a*, and disposing, in each accommodating chamber 30*a*, at least two rows of battery units 10A disposed in a staggered manner, it is easy to realize grouping and assembling of the plurality of first battery cells 10 of the battery 200 to increase the assembling convenience of the battery 200, and meanwhile, the partition plate 40 can have a certain structural reinforcing effect for the box 30, facilitating to increase the use reliability of the box 30.

For example, there are a plurality of partition plates 40 disposed at intervals in the width direction of the box 30, and the partition plates 40 adapts to the shape of the battery unit 10A. For example, when the battery unit 10A is configured in a "Z" shape, the partition plates 40 may be configured in a "Z" shape, so that the partition plates 40 can better adapt to the battery unit 10A, and easily define the plurality of accommodating chambers 30*a*, each of which is provided with a plurality of rows of battery units 10A, and any two adjacent rows of the plurality of rows of battery units 10A in each accommodating chamber 30*a* are disposed in a staggered manner.

Of course, in other embodiments of the present application, referring to FIG. 2, no partition plate 40 may be disposed within the box 30, and here, there may be one containing chamber 30*a*.

In some embodiments of the present application, the partition plate 40 is thermally connected to adjacent battery units 10A, so that heat exchange exists between the partition plate 40 and the adjacent battery units 10A, and the partition plate 40 is thermally connected to the box 30, so that heat of the battery unit 10A may be transferred to the box 30 through the partition plate 40.

It can be understood that for a single partition plate 40, the battery units 10A thermally connected to the partition plate 40 may be in one or more rows.

In the above technical solution, by disposing the partition plate 40 thermally connected to the adjacent battery units 10A and the partition plate 40 thermally connected to the box 30, for the battery unit 10A located at the outermost side in the width direction of the box 10, the heat from the battery unit 10A can be transferred not only to battery units 10A in an adjacent row, but also to the partition plate 40 and be transferred to the box 30, further realizing dispersed transfer of heat from the battery units 10A, and facilitating further to increase the thermal management effect for the battery 200.

It can be understood that the present application does not specifically limit the position of the partition plate 40 for thermally-conductive connection with the box 30; for example, at least a side of the partition plate 40 in the height direction is thermally connected to the corresponding wall of the box 30, and/or at least a side of the partition plate 40 in the length direction or the width direction is thermally connected to a corresponding wall of the box 30.

It can be understood that the partition plate 40 being thermally connected to adjacent first battery cells 10 may refer to the partition plate 40 being thermally connected to at least one first battery cell 10 of the adjacent first battery cells 10; further, the partition plate 40 is thermally connected to each first battery cell 10 of the adjacent first battery cells 10 to facilitate that the heat from each first battery cell 10 in the battery cells 10A adjacent to the partition plate 40 can be transferred not only towards the first battery cell 10 of the adjacent row of battery cells 10A, but also to the partition plate 40 and transferred to the box 30, and it is further realized to dispersedly transfer heat from each first battery cell 10 in the battery cells 10A adjacent to the partition plate 40, easily increasing the thermal management effect for the batteries 200 again.

Optionally, a first thermally-conductive adhesive is disposed between the partition plate 40 and the adjacent battery unit 10A, and a second thermally-conductive adhesive is disposed between the partition plate 40 and the box 30.

According to some embodiments of the present application, referring to FIG. 4, the second side wall 112 of one of the first battery cells 10 disposed in an intersected manner is parallel to the first side wall 111 of another first battery cell 10.

Therefore, the extension directions of the two first battery cells 10 disposed in an intersected manner are disposed vertically, so that the two first battery cells 10 disposed in an intersected manner can be connected in an abutting manner, and thus the arrangement of the first battery cells 10 is simpler, and the arrangement of the two first battery cells 10 disposed in an intersected manner is more compact.

According to some embodiments of the present application, adjacent battery cells 10 are in thermally-conductive connection.

"Thermally-conductive connection" includes direct or indirect thermally-conductive connection of two adjacent first battery cells 10.

Exemplarily, adjacent two first battery cells 10 are in direct thermal connection, on one hand, enabling that the arrangement of the first battery cells 10 is more compact, and on the other hand, enabling that the adjacent first battery cells 10 can achieve better heat conduction therebetween, so that temperature equalizing is enabled for a plurality of first battery cells 10 to prevent an excessively high temperature of a local first battery 10, and heat from first battery cells 10 can be dissipated more quickly, thereby increasing the performance and use safety of the battery 200.

Figure 7:
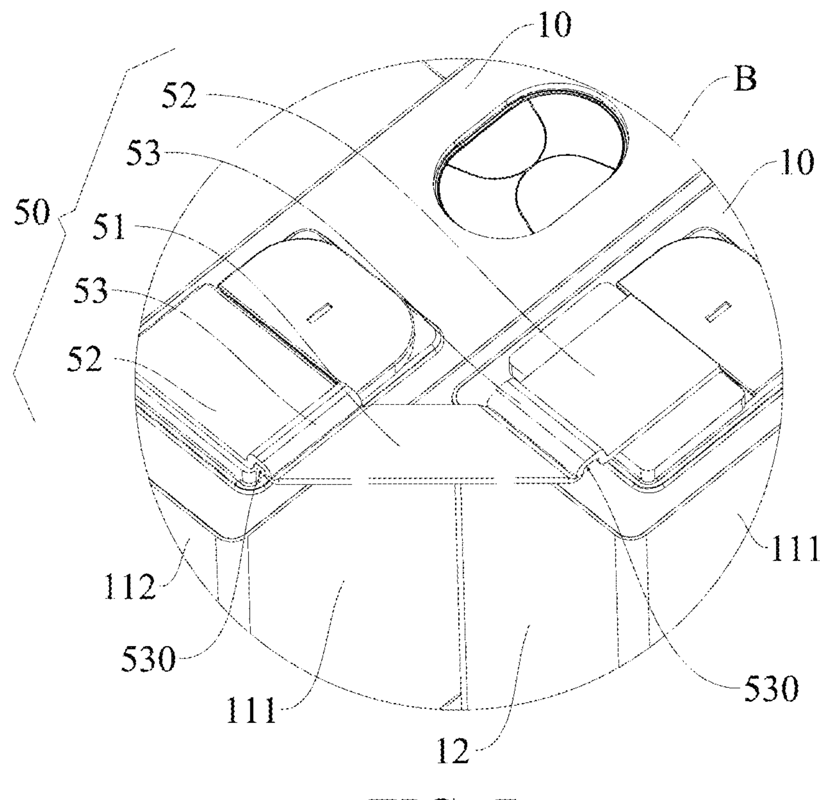
FIG. 7 is a enlarged view of B in FIG. 5.

According to some embodiments of the present application, referring to FIGS. 5-7, the first battery cells 10 at row ends of adjacent rows are electrically connected by a busbar 50, and at least a part of the busbar 50 is disposed obliquely relative to the first side wall 111 of the first battery cell 10.

Thus, by disposing the first battery cells 10 at row ends of adjacent rows electrically connected by the busbar 50, it is facilitated to achieve electrical connection between a plurality of rows of battery units 10A, so that the plurality of rows of battery units 10A can be formed into a whole, thereby reducing the difficulty for electrically connecting the plurality of rows of battery units 10A.

It is worth to note that, referring to FIG. 5 and FIG. 6, because two oppositely disposed first side walls 111 of adjacent first battery cells 10 are disposed in a staggered manner to enable that ends of first battery cells 10 at row ends of adjacent rows are not on a same horizontal line, and because an electrode terminal of a first battery cell 10 is usually disposed at an end of the first battery cell 10, the electrode terminals of the first battery cells 10 at the row ends of the adjacent rows are not on a same horizontal line.

Therefore, it is to obliquely dispose at least a part of the busbar 50 relative to the first side wall 111 of the first battery cell 10, so that a manner of disposing at least part of the busbar 50 can better satisfy the manner that the two oppositely disposed first side walls 111 of the adjacent first battery cells 10 are disposed in a staggered manner.

In this way, it easily realize electrical connection between a plurality of battery units 10A, so that the span of the busbar 50 is not too long, and a shorter busbar 50 can reduce an overcurrent path of the busbar 50, effectively improving heat generation by the busbar 50 during sustained overcurrent.

For example, the busbar 50 is disposed at a side of the first battery cell 10 in the height direction, that is, the busbar 50 is disposed at the top or bottom of the first battery cell 10.

It should be noted that, as the top or bottom of the first battery cell 10 is usually provided with an explosion-proof valve, in the present application, by obliquely disposing at least a part of the busbar 50 relative to the first side wall 111 of the first battery cell 10, the busbar 50 can avoid the explosion-proof valve, that is, the busbar 50 is prevented from blocking the explosion-proof valve of the first battery cell 10.

It should be noted that, because the first side wall 111 is the side wall 11 of the first battery cell 10 having the largest area, the expansion force of the first battery cell 10 at the first side wall 111 is more larger than the expansion force at the other side walls 11.

In the present application, by obliquely disposing at least a part of the busbar 50 relative to the first side wall 111 of the first battery cell 10, the busbar 50 can alleviate the expansion force of the first battery cell 10 at the first side wall 111 to reduce a pulling force on the busbar 50 when the first battery cell 10 expands, thereby facilitating to prolong the service life of the busbar 50.

According to some embodiments of the present disclosure, referring to FIG. 7, the busbar 50 includes a transition portion 51 and two electrical connection portions 52.

Two ends of the transition portion 51 are connected to the two electrical connection portions 52, respectively, the extension direction of the transition portion 51 has an included angle with both the first side wall 111 and the second side wall 112, and the two electrical connection portions 52 are electrically connected to the two first battery cells 10, respectively.

Exemplarily, the transition portion 51 and the electrical connection portion 52 may be an integrally formed structure, to easily reduce the difficulty for disposing the busbar 50 and easily achieve electrical connection between two rows of battery units 10A.

Here, it should be noted that when the first battery cell 10 expands in the direction of the first side wall 111 or the second side wall 112, the expansion force may cause two adjacent rows of battery units 10A to apply a pulling force to the busbar 50 in the direction of the first side wall 111 or the second side wall 112, which may easily cause breakage of the busbar 50 to reduce the service life of the busbar 50.

Therefore, in the present application, by disposing the extension direction of the transition portion 51 having an included angle with both the first side wall 111 and the second side wall 112, the transition portion 51 can alleviate the expansion force of the first battery cell 10 on the first side wall 111 and the second side wall 112, and the transition portion 51 does not directly face the first side wall 111 and the second side wall 112. In this way, when the first battery cell 10 expands, the transition portion 51 has an angle with the direction of the expansion force to reduce the force on the transition portion 51, avoiding direct-force-loading breakage of the transition portion 51 to prolong the service life of the busbar 50.

Figure 11:
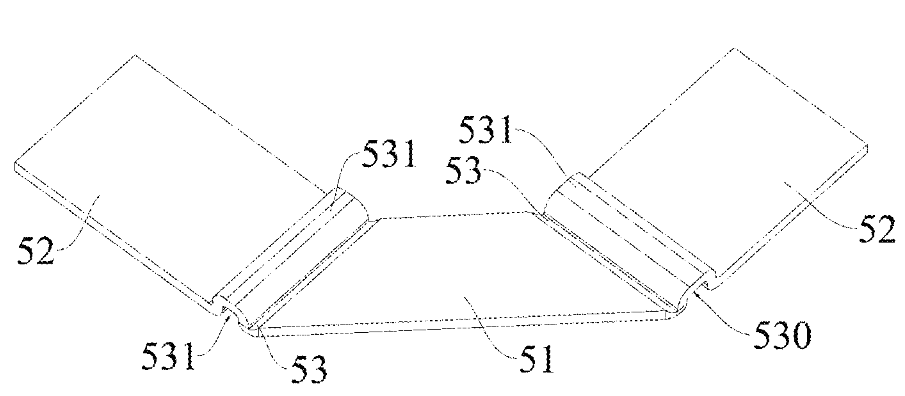
FIG. 11 is a schematic diagram of a structure of a busbar according to some embodiments of the present application.
Figure 12:
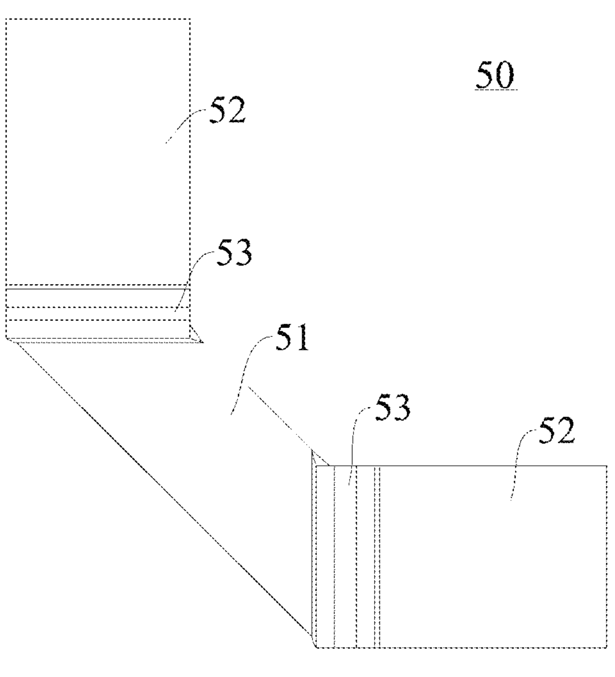
FIG. 12 is a top view of a busbar according to some embodiments of the present application.
Figure 13:
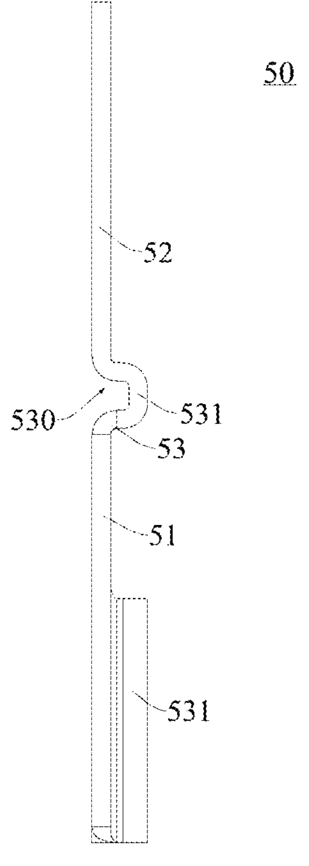
FIG. 13 is a side view of a busbar according to some embodiments of the present application.
Figure 14:
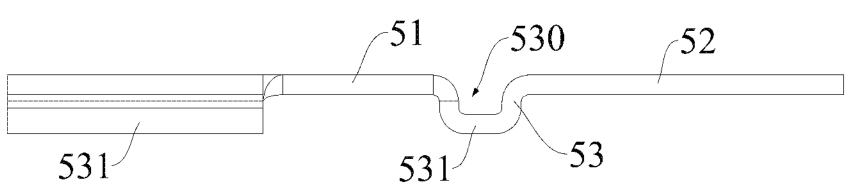
FIG. 14 is a side view of a busbar from another perspective according to some embodiments of the present application.
Figure 15:
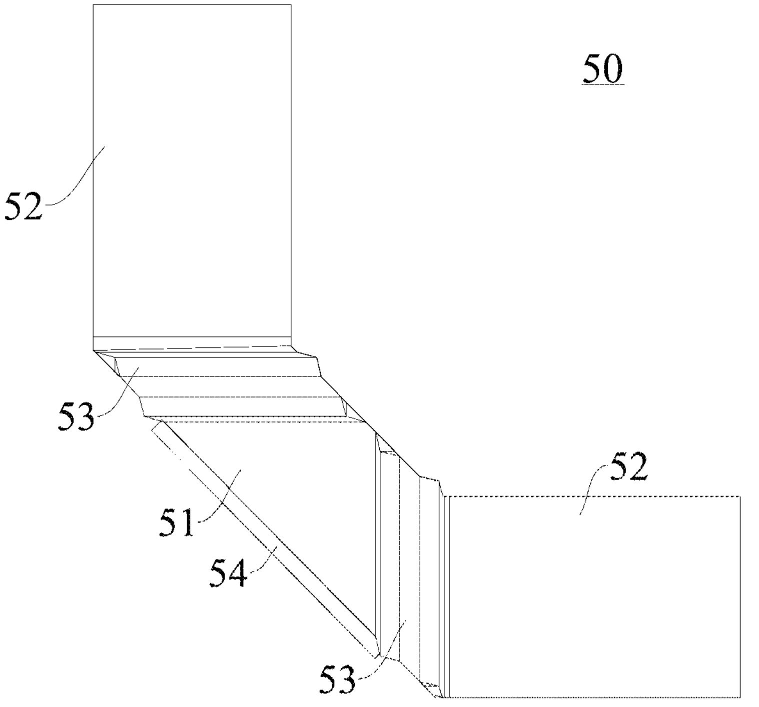
FIG. 15 is a schematic diagram of a structure of a busbar according to some other embodiments of the present application.

According to some embodiments of the present application, referring to FIG. 11, FIG. 12, and FIG. 15, the transition portion 51 is provided with a stretch-deformable buffer portion 53.

Therefore, by disposing the buffer portion 53, it can be stretched and deformed under the action of an expansion force when the first battery cell 10 expands and pulls the busbar 50, to alleviate the stress generated when the first battery cell 10 expands, thereby alleviating an pulling force on the busbar 50 caused by the expansion of the first battery cell 10, facilitating to prolong the service life of the busbar 50, and enabling small deformation generated after the battery 200 expands, so that the deformation of the battery 200 is controllable, facilitating to increase the safety factor of the battery 200.

Exemplarily, the buffer portion 53 may be configured as a corrugated structure or a stepped structure or an elastic structure, so that when the buffer portion 53 does not significantly increase the size of the busbar 50 when it is normally used, and the buffer portion 53 can be stretched and deformed under the action of the expansion force when the first battery cell 10 expands and pulls the busbar 50 to alleviate the stress generated when the first battery cell 10 expands.

Of course, the buffer portion 53 may also be configured as other structures capable of realizing tensile deformation, which is not limited herein.

According to some embodiments of the present application, referring to FIG. 11, FIG. 12, and FIG. 15, a stretch-deformable buffer portion 53 is connected between each electrical connection portion 52 and the transition portion 51.

Exemplarily, as shown in FIG. 7 and FIG. 11, at least two buffering portions 53 are provided, and located between two ends of the transition portion 51 and the two electrical connecting portions 52, respectively.

In this way, the distance between the buffer portion 53 and the first battery cell 10 is smaller, to reduce the action distance of the expansion force of the first battery cell 10, and the at least two buffer portions 53 can separately alleviate the stress generated when the corresponding first battery cell 10 expands, to reduce a pulling force on the bus bar 50 caused by the expansion of first battery cell 10, facilitating to prolong the service life of the bus bar 50, and enabling small deformation generated after the battery 200 expands, so that the deformation of the battery 200 is controllable, to facilitate to increase the safety factor of the battery 200.

Exemplarily, referring to FIG. 7, two buffer portions 53 are provided, wherein one buffer portion 53 is disposed parallel to the first side wall 111, that is, it extends in the length direction of the first battery cell 10 (i. e., the X direction in FIG. 3), and the tensile-deformation direction of the buffer portion 53 is the width direction of the first battery cell 10, so that the buffer portion 53 can alleviate the expansion force of the first battery cell 10 on the first side wall 111, and the other buffer portion 53 is disposed parallel to the second side wall 112, that is, it extends in the width direction of the first battery cell 10 (i. e., the Y direction in FIG. 3), and the tensile-deformation direction of the buffer portion 53 is the length direction of the first battery cell 10, so that the buffer portion 53 can alleviate the expansion force of the first battery cell 10 on the second side wall 112.

Of course, the disposing position and the extending direction of the buffer portion 53 above are only for illustration, not for limitation.

According to some embodiments of the present disclosure, referring to FIG. 11, FIG. 13, FIG. 14, FIG. 16, and FIG. 17, the buffer portion 53 includes at least one bending portion 531 having an opening 530.

Therefore, the bending portion 531 can be bent by disposing the opening 530, so when the expansion force is applied to the buffer portion 53 to stretch and deform it, the opening 530 can partially alleviate the expansion force, and the bending portion 531 can extend the transfer path of the expansion force, so that the bending portion 531 having the opening 530 can be used to further alleviate the stress generated when the first battery cell 10 expands to reduce a pulling force on the bus bar 50 caused by the expansion of the first battery cell 10, and further prolong the service life of the bus bar 50.

Figure 16:
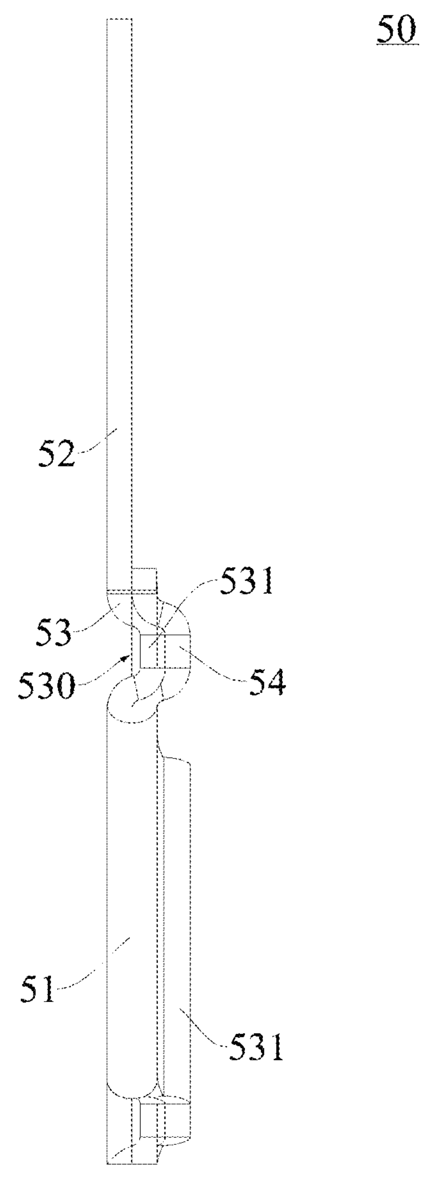
FIG. 16 is a bottom diagram of a busbar according to some other embodiments of the present application.
Figure 17:
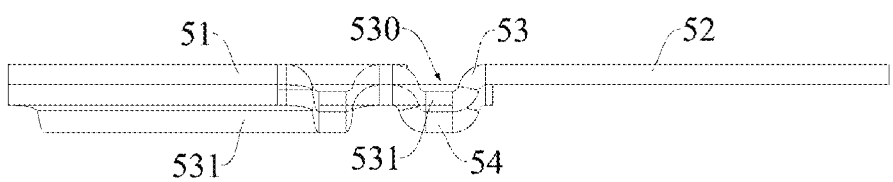
FIG. 17 is a side view of a busbar according to some other embodiments of the present application.

According to some embodiments of the present application, referring to FIG. 15 to FIG. 17, the transition portion 51 is provided with a stiffener 54 which is a conductive-material member.

In this way, by disposing the stiffener 54, it is facilitated to enhance the structural strength of the transition portion 51 to avoid its breakage problem, and the stiffener 54 is a conductive-material member, so that the stiffener 54 can also has an effect of electrically connecting two adjacent battery units 10A to enhance the overcurrent capability of the busbar 50.

It should be noted that the material of the stiffener 54 and the material of the transition portion 51 may be the same material to reduce the difficulty for producing the stiffener 54, or the stiffener 54 and the transition portion 51 may have different materials, which is not limited herein.

Exemplarily, the conductive material includes, but is not limited to, a conductive metal, a conductive alloy, a conductive structural adhesive, or the like.

For example, the conductive material is configured as a conductive metal, so that the conductive metal can enhance the structural strength of the transition portion 51 to avoid the breakage problem of the transition portion 51, and the conductive metal can has an effect of electrically connecting two adjacent battery units 10A, thereby enhancing the overcurrent capability of the busbar 50.

According to some embodiments of the present application, referring to FIG. 16 and FIG. 17, the transition portion 51 and the stiffener 54 are disposed in a stacked manner.

"Being disposed in a stacked manner" means that the transition portion 51 and the stiffener 54 are stacked to form a structure with at least two layer. Exemplarily, the transition portion 51 and the stiffener 54 may be integrally formed as a double-layer structure to reduce processing difficulty, or the stiffener 54 may be separately formed, and the stiffener 54 may be welded or bonded to the transition portion 51 to form a double-layer structure.

In this way, the stiffener 54 does not occupy too much installation space to facilitate to realize a miniaturization design for the busbar 50, and to easily increase the overcurrent area of the busbar 50 at the transition portion 51, thereby further reducing the temperature rise caused when the busbar 50 has overcurrent.

According to some embodiments of the present application, referring to FIG. 2, the battery 200 includes a box 30.

A plurality of rows of battery units 10A are disposed in the box 30, each row of the battery units 10A includes a plurality of first battery cells 10, gaps are disposed between the plurality of rows of battery units 10A and an inner wall of the box 30, and the gaps are filled with a filler 60.

In the battery 200 of the embodiment of the present application, by disposing the plurality of rows of battery units 10A in the box 30 to protect the battery units 10A by the box 30, and disposing the filler 60 in the gap between the plurality of rows of battery units 10A and the inner wall of the box 30, the battery units 10A in the box 30 can be fixed to enhance the stability of the battery units 10A in the box 30, the battery units 10A also does not rigidly contact the inner wall of the box 30, to avoid damage caused by collision between the battery units 10A and the inner wall of the box 30, and further, when a force is applied to the outside of the box 30, the filler 60 can partially absorb a collision force, to reduce the collision force applied to the battery units 10A.

For example, the filler 60 includes, but is not limited to, a silicone material member, or foam, or rubber, etc.

For example, the filler 60 may be a silicone material member, so that flexible contact can be achieved for the battery unit 10A and the inner wall of the box 30 by the silicone material member to avoid rigid contact thereof, and especially, when the outer side of the box 30 is deformed by a force, the silicone material member may partially absorb the collision force to reduce the collision force on the battery unit 10A, thereby reducing the deformation degree of the battery unit 10A.

Optionally, the filler 60 may be fixed by welding to the inner wall of the box 30 and at least one of corresponding first battery cells 10, and/or the filler 60 may be sandwiched between the first battery cell 10 and the inner wall of the box 30, and is fixed by the pre-tightening force between the first battery cell 10 and the inner wall of the box 30.

In some embodiments of the present application, referring to FIG. 2 and FIG. 8-FIG. 10, the filler 60 includes a second battery cell 61 which is disposed in the gap between the battery unit 10A and the inner wall of the box 30, and the second battery cell 61 is electrically connected to the first battery cell 10.

Here, the second battery cell 61 and the first battery cell 10 have an energy-storing function, and both can be used to provide electrical energy. For example, the specification of the second battery cell 61 may be different from that of the first battery cell 10.

In the above technical solution, by disposing the second battery cell 61 in the gap between the battery unit 10A and the inner wall of the box 30 to effectively use the gap, appearing due to the plurality of first battery cells 10 that are disposed in a staggered manner, between the battery unit 10A and the inner wall of the box 30, the space utilization rate (or the volume utilization rate) of the battery 200 is increased, facilitating to increase the volume energy density and weight energy density of the battery 200.

Figure 8:
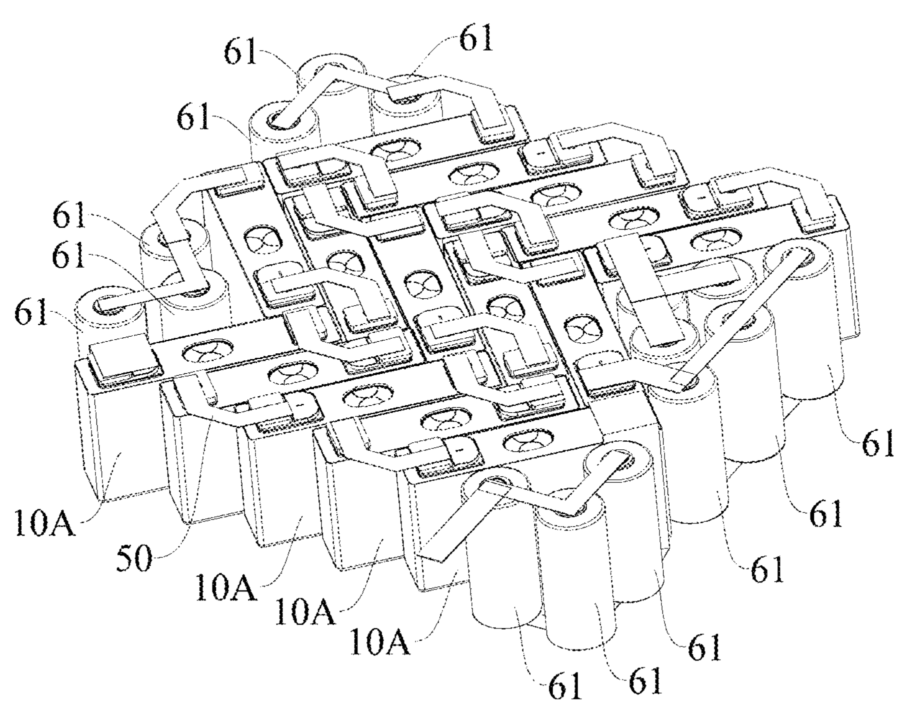
FIG. 8 is a schematic diagram of a structure of a plurality of rows of battery units according to some other embodiments of the present application.
Figure 9:
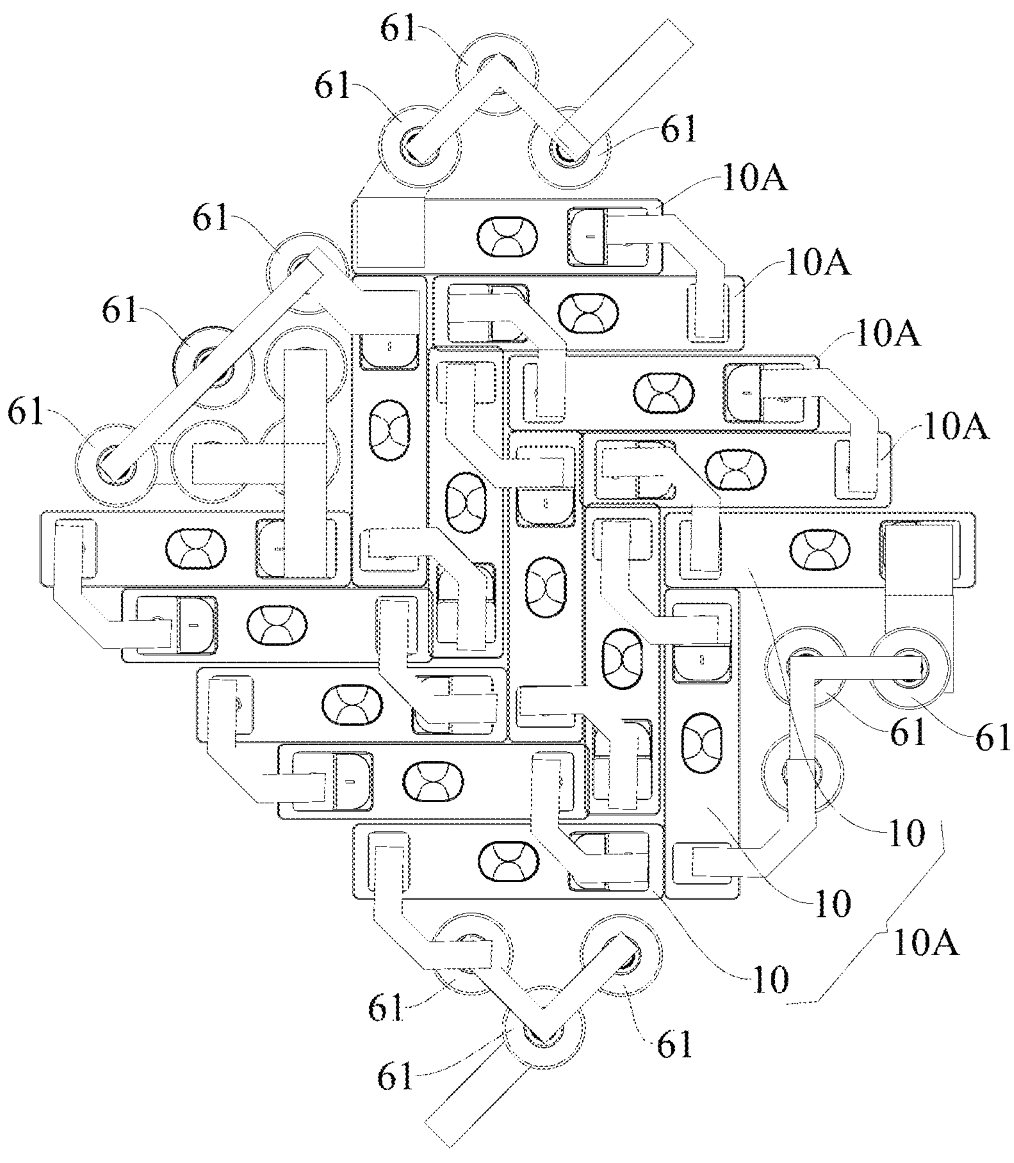
FIG. 9 is a top view of a plurality of rows of battery units shown in FIG. 8.
Figure 10:
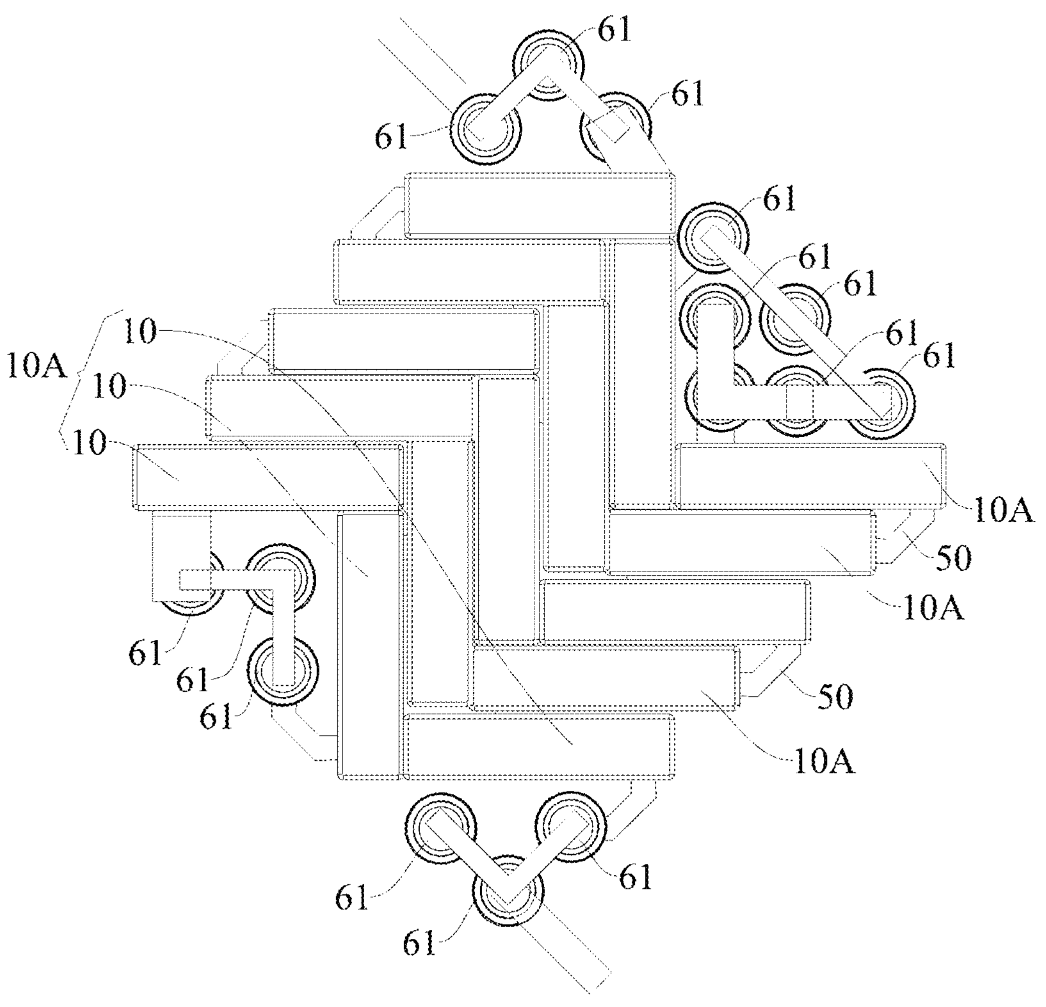
FIG. 10 is a bottom view of a plurality of rows of battery units shown in FIG. 8.

In some embodiments of the present application, referring to FIG. 8-FIG. 10, the second battery cell 61 is a cylindrical battery.

Therefore, the second battery cell 62 can better use the gap between the plurality of rows of battery units 10A and the inner wall of the box, facilitating to increase the energy density of the battery 200.

In some embodiments of the present application, referring to FIG. 9 and FIG. 10, there are a plurality of second battery cells 61, and the plurality of second battery cells 61 and the plurality of first battery cells are arranged into a rectangular battery module.

Therefore, the second battery cells 61 and the first battery cells 10 can better adapt to the shape of the box 30 after being arranged.

In some embodiments of the present application, a volume of the second battery cell 61 is less than a volume of the first battery cell 10.

In the above technical solution, by setting the volume of the second battery cell 61 smaller than that of the first battery cell 10, it is facilitated to match the volume of the second battery cell 61 with the volume of the gap between the battery unit 10A and the inner wall of the box 30, and since the gap between the battery unit 10A and the inner wall of the box 30 is formed by the cooperation between battery cells 200, disposed in a staggered manner, in adjacent rows, and the inner wall of the box 30, the volume of the gap between the battery unit 10A and the inner wall of the box 30 is usually smaller in size than the volume of the first battery cell 10, thereby easily increasing the matching of the second battery cell 61 with the gap between the battery unit 10A and the inner wall of the box 30 to easily arrange the second battery cell 61.

Alternatively, the shape of the second battery cell 61 adapts to the shape of the gap between the battery unit 10A and the inner wall of the box 30. For example, the second battery cell 61 and the gap between the battery unit 10A and the inner wall of the box 30 are both in a cuboid structure. Exemplarily, both the second battery cell 61 and the first battery cell 10 are in a cuboid structure, the volume of the second battery cell 61 is basically a product of a length, a width, and a height of the second battery cell 61, and the volume of the first battery cell 10 is basically a product of a length, a width, and a height of the first battery cell 10.

In some embodiments of the present application, at an end of each row of battery units 10A, the side wall 11 of the second battery cell 61 is flush with an end face of an adjacent row of battery units 10A. "Being flush" includes, but is not limited to, that two surfaces are located on the same plane.

In the above technical solution, by setting, at the end of each row of battery units 10A, the side wall 11 of the second battery cell 61 being flush with the end face of the battery unit 10A in the adjacent row, the second battery cell 61 and a side-by-side battery unit 10A can be arranged relatively regularly, facilitating to simplify the shape of the internal space of the box 30 and reasonably use the internal space of the box 30.

For example, the first battery cell 10 and the second battery cell 61 are both in a cuboid structure, the second battery cell 61 is disposed in the gap between the end of each battery unit 10A and the inner wall of the box 30, and the disposing of each second battery cell 61 facilitates the end of the battery pack formed by the second battery cell 61 and the side-by-side battery unit 10A being flush with the end, corresponding to the gap between the battery unit 10A and the inner wall of the box 30, of another row of battery units 10A, thereby facilitating to simplify the structure of the inner wall of the box 30.

In some embodiments of the present application, the first battery cell 10 and the second battery cell 61 are electrically connected at least in series, and the second battery cell 61 and the first battery cell 10 have different chemical systems.

Alternatively, when there is one second battery cell 61, the second battery cell 61 is connected in series to a corresponding first battery cell 10; or when there is one second battery cell 61, the second battery cell 61 is connected in series to at least one first battery cell 10, and the second battery cell 61 is connected in parallel to at least one first battery cell 10. When there are a plurality of second battery cells 61, the plurality of second battery cells 61 may have identical or different electrical connection manners, and for a single second battery cell 61, the second battery cell 61 and the first battery cell 10 are electrically connected at least in series.

In the above technical solution, by setting different chemical systems for the second battery cell 61 and first battery cell 10, it is facilitated to enable different performance of the second battery cell 61 and the first battery cell 10, the first battery cell 10 and the second battery cell 61 electrically connected at least in series facilitates to improve the performance of the entire battery 200 by using the second battery cell 61. For example, by selecting a suitable chemical system, the second battery cell 61 has a higher low-temperature discharge specific power density than the first battery cell 10, and the above connection manner for the second battery cell 61 can increase the discharge capability of the battery 200 at a low temperature, and facilitate to simplify an electrical connection manner of the battery 200 and a structure design of the battery 200.

Optionally, the chemical system of the first battery cell 10 includes, but is not limited to, a lithium iron phosphate system, a ternary lithium system, a lithium manganate system, and the like.

According to some embodiments of the present disclosure, referring to FIG. 2, the filler 60 includes a thermally-conductive member 63.

The thermally-conductive member 63 is thermally connected to the box 30, and is thermally connected to opposite first side wall 111 and/or second side wall 112.

"The thermally-conductive member 63 being thermally connected to opposite first side wall 111 and/or second side wall 112" includes the thermally-conductive member 63 being thermally connected to an opposite first side wall 111, or the thermally-conductive member 63 being thermally connected to an opposite second side wall 112, or the thermally-conductive member 63 being thermally connected to both opposite first side wall 111 and second side wall 112.

Here, "being thermally connected" means that heat can be transferred between the thermally-conductive member 63 and the box 30.

In this way, the heat generated by the battery unit 10A can be transferred to the box 30 by the thermally-conductive member 63, so that it is easy to increase the heat dissipation path of the battery unit 10A to increase the heat dissipation capability of the battery unit 10A, further reducing the temperature rise of the battery 200 in use.

Exemplarily, the thermally-conductive member 63 includes, but is not limited to, a thermally-conductive adhesive, a thermally-conductive plate, or another structure made of a thermally-conductive material.

According to some embodiments of the present application, referring to FIG. 2, the filler 60 includes a monitor 62 for detecting an operating state of each first battery cell 10.

In this way, the operation state of the first battery cell 10 may be monitored in real time by the monitor 62 to easily control the state of the first battery cell 10, so that a faulty first battery cell 10 can be found in time, thereby reducing a risk of a safety problem of the battery 200.

Exemplarily, the monitor 62 includes, but is not limited to, a gas pressure sensor, or a gas analysis sensor, or a lithium plating detection instrument, or a detector for detecting the voltage of the first battery cell 10, or a detector for detecting the internal resistance of the first battery cell 10, or a detector for detecting the temperature of the first battery cell 10, and the like, and the operating state of the first battery cell 10 includes, but is not limited to, the voltages of the positive and negative electrodes of the first battery cell 10, the position of the pressure relief structure, and the like, so as to monitor the performance and safety of the first battery cell 10.

Therefore, by disposing the monitor 62 to monitor information on the first battery cell 10 by the monitor 62, such as the voltage, the internal resistance, the temperature, etc. of the first battery cell 10 in real time, to obtain the operating state of the first battery cell 10, the user can easily know the current state of the first battery cell 10 in time, and can find a faulty first battery cell 10, reducing a risk of a safety problem of the battery 200.

Figure 18:
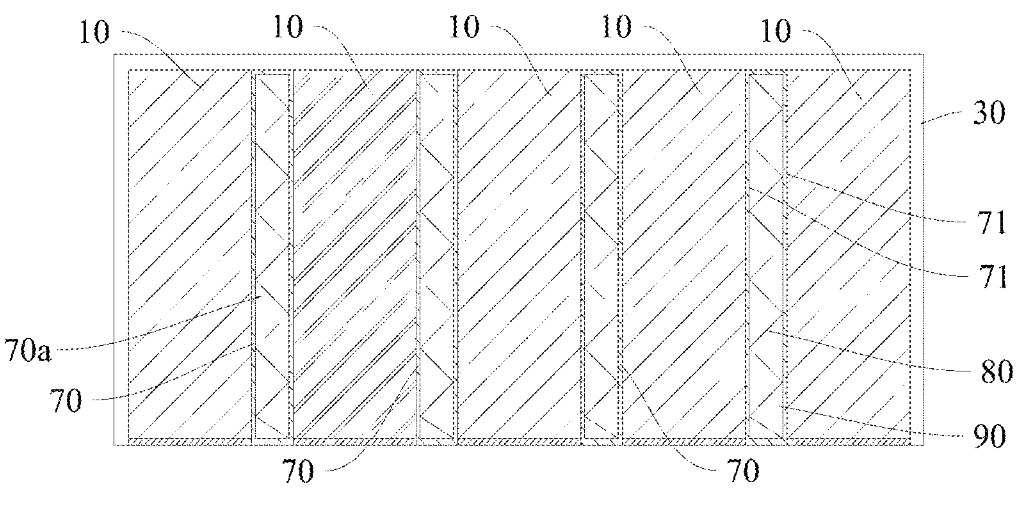
FIG. 18 is a cross sectional view of a thermally-conductive stiffener located between two first battery cells according to some embodiments of the present application.

According to some embodiments of the present application, referring to FIG. 18, the battery 200 further includes: a thermally-conductive stiffener 70, at least two first battery cells 10 are placed in the box 30, at least one first battery cell 10 is thermally connected to the thermally-conductive stiffener 70, and the thermally-conductive stiffener 70 is thermally connected to the box 30.

In the above technical solution, by disposing the thermally-conductive stiffener 70 thermally connected to at least one first battery cell 10, and the thermally-conductive stiffener 70 thermally connected to the box 30, the thermally-conductive stiffener 70 can be used to direct heat from at least one first battery cell 10 to the box 30, further increasing decentralized transfer of heat from the first battery cell 10, thereby further suppressing heat diffusion; and also, the thermally-conductive stiffener 70 can has a certain structural strengthening effect on the first battery cell 10 and/or the case 30, facilitating to increase the sue reliability of the battery 200.

Optionally, the thermally-conductive stiffener 70 has a first side and a second side which are located on different sides of the thermally-conductive stiffener 70, respectively, the first side is thermally connected to the first battery cell 10, and the second side is thermally connected to the box 30, facilitating to enable that the thermally-conductive stiffener 70 adapts to the arrangement of the first battery cell 10 and the box 30.

Of course, in other embodiments, the thermally-conductive stiffener 70 may also be thermally connected to other side walls 11 of a corresponding first battery cell 10; and the thermally-conductive stiffener 70 may also be disposed between the inner wall of the box 30 and the battery unit 10A.

In some embodiments of the present application, referring to FIG. 18, a cavity 70*a* for buffering stress is disposed in the thermally-conductive stiffener 70, and the cavity 70*a* is configured to be deformable to buffer stress when the thermally-conductive stiffener 70 is pressed.

In the above technical solution, by disposing the cavity 70*a* for buffering stress in the thermally-conductive stiffener 70, when the first battery cell 10 expands in a use process, due to the provision of the cavity 70*a*, the thermally-conductive stiffener 70 can deform when being subjected to an action force from the first battery cell 10, so as to reduce a pressing force between the thermally-conductive stiffener 70 and the first battery cell 10 to avoid damage to the thermally-conductive stiffener 70 and the first battery cell 10, thereby facilitating to increase the reliability of the thermally-conductive stiffener 70 and the first battery cell 10; and further, the provision of the cavity 70*a* may contribute to absorb assembly tolerance for first battery cells 10 in a row in a process of assembling the thermally-conductive stiffener 70 and the first battery cell 10, increasing convenience to assemble the thermally-conductive stiffener 70 and first battery cell 10; and the provision of the cavity 70*a* facilitates to reduce the weight of the thermally-conductive stiffener 70, thereby reducing the weight of the battery 200, and facilitating to increase the energy density of the battery 200.

Referring to FIG. 18, in some embodiments of the present application, the thermally-conductive stiffener 70 includes two thermally-conductive side walls 71 disposed opposite to each other, the thermally-conductive side walls 71 are thermally connected to opposite first side walls 111, and support structures 80 respectively connected to the two thermally-conductive side walls 71 are disposed within the cavity 70*a*.

In the above technical solution, by disposing within the cavity 70*a* the support structures 80 respectively connected to the two thermally-conductive side walls 71, the support structure 80 can support the two thermally-conductive side walls 71, thereby increasing the bending-deformation resistance of the thermally-conductive stiffener 70 and increasing the reliability of the thermally-conductive stiffener 70.

Exemplarily, two thermally-conductive side walls 71 of the thermally-conductive stiffener 70 are disposed opposite to each other in the first direction X, the cavity 70*a* is located between the two thermally-conductive side walls 71, each thermally-conductive side wall 71 extends in the second direction Y, and the thermally-conductive stiffener 70 has a simple structure and is convenient to process.

Referring to FIG. 18, in some embodiments of the present application, the support structure 80 is formed as a mesh structure within which a heat-absorbing-material member 90 is filled, and the heat-absorbing-material member 90 is also disposed in the cavity 70*a*.

In the above technical solution, by setting the support structure 80 being formed as a mesh structure and disposing the heat-absorbing-material member 90 in the cavity 70*a*, it easily alleviate blocking of the heat-absorbing-material member 90 by the support structure 80, facilitating to increase the filling capacity of the heat-absorbing-material member 90 for the cavity 70*a*; and the heat-absorbing-material member 90 easily contacts with the thermally-conductive side walls 71, facilitating to increase a thermally-conductive capacity, and facilitating to reduce the requirement for the physical state of the heat-absorbingmaterial member 90; and if the heat-absorbing-material member 90 is subjected to a physical-state change during heat absorption, the requirement for the physical-state change of the heat-absorbing-material member 90 can also be reduced.

Optionally, the heat-absorbing-material member 90 is a phase-change heat-absorbing-material member 90, such as a solid-liquid phase change material member (such as paraffin, etc.), and the phase-change heat-absorbing-material member 90 undergoes a solid-liquid phase change at a high temperature and absorbs heat, to further increase the heat-absorption, heat-conduction capacity of the thermally-conductive stiffener 70, to reduce the heat transferred from the first battery cell 10 to other first battery cells 10 opposite to the first battery cell 10 in the first direction X, so heat diffusion is further suppressed to increase the safety of the battery 200.

Optionally, a plurality of sub-chambers separately disposed are defined between the support structure 80 and each thermally-conductive side wall 71, adjacent sub-chambers are communicated, and the heat-absorbing-material member 90 is disposed in the plurality of sub-chambers, so, it is easy to enable that the support structure 80 can support the side wall 11 of each thermally-conductive side wall 71 to a certain extent, and that the spacing between two thermally-conductive side walls 71 can change under the action of an external force, better balancing stress buffering and bending resistance ability.

Figure 19:
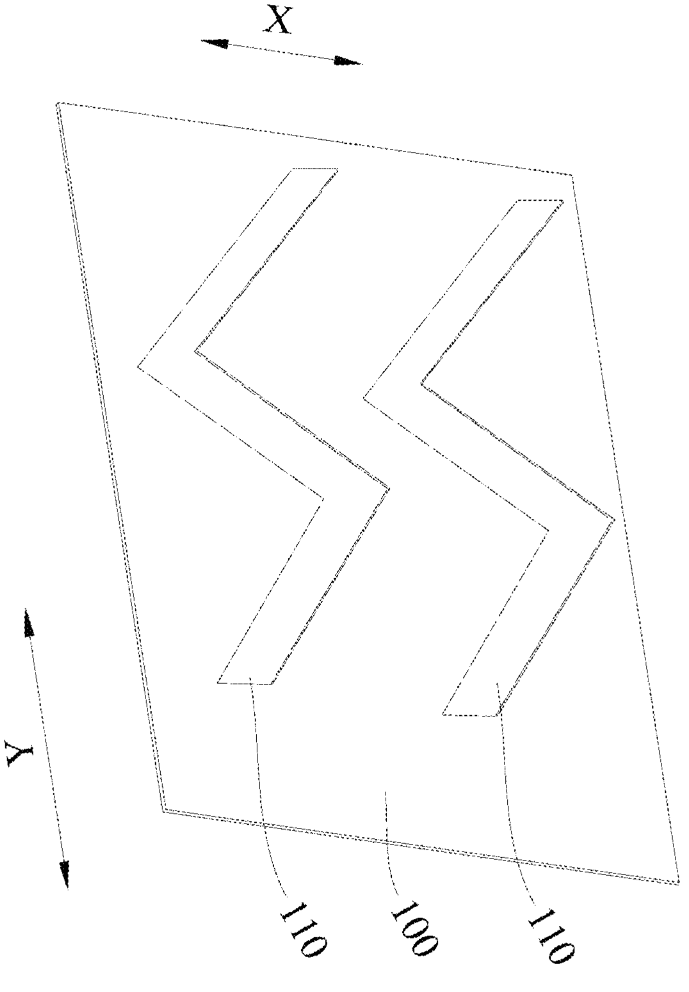
FIG. 19 is a schematic diagram of a structure of a heat exchange plate and an insert according to some embodiments of the present application.
Figure 20:
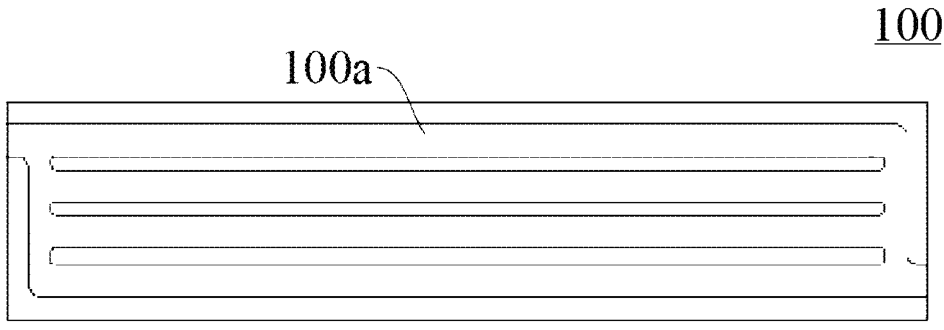
FIG. 20 is a schematic diagram of a flow channel of the heat exchange plate shown in FIG. 19.

In some embodiments of the present application, the battery 200 further includes a heat exchange plate 100 and a thermally-conductive insert 110, the heat exchange plate 100 is located at sides of at least two first battery cells 10 in the third direction Z which is disposed perpendicular to the first direction X and second direction Y; referring to FIG. 20, a heat exchange channel for placing a heat exchange medium is disposed in the heat exchange plate 100; and referring to FIG. 19, the insert 110 is disposed at a surface of the heat exchange plate 100 close to the first battery cell 10, and the insert 110 is thermally conducted to the first battery cell 10.

In the above technical solution, the heat exchange plate 100 and the insert 110 are disposed, the heat exchange channel for placing the heat exchange medium is disposed in the heat exchange plate 100, and the insert 110 is thermally connected to the first battery cell 10, so that the heat exchange plate 100 can exchange heat with the first battery cell 10 at least through the insert 110, to further reduce heat transferred from the first battery cell 10 to another first battery cell 10, thereby further suppressing heat diffusion.

Exemplarily, taking an example in which the third direction Z is the height direction of the first battery cells 10, the heat exchange plate 100 is located at lower sides of a plurality of first battery cells 10, the insert 110 is disposed at the upper surface of the heat exchange plate 100, and the insert 110 is thermally connected to the plurality of first battery cells 10. Of course, the insert 110 may also be thermally connected to one first battery cell 10.

Optionally, the heat exchange plate 100 is thermally connected to at least two first battery cells 10 to add a heat transfer manner between the heat exchange plate 100 and the first battery cells 10, so as to disperse heat from the first battery cells 10, so it is easy to further suppress heat diffusion.

It can be understood that when the first battery cell 10 has a too high temperature, the heat exchange plate 100 may be used to cool the first battery cell 10 to reduce its temperature; and when the first battery cell 10 has a too low temperature, the heat exchange plate 100 may be used to heat the first battery cell 10 to increase its temperature. The heat transfer medium may be liquid and/or gas, the heat exchange plate 100 is used to regulate temperatures of at least two first battery cells 10; and in the case where the heat exchange plate 100 is used to cool the first battery cell 10, the heat exchange channel may accommodate a cooling medium to regulate the temperature for a plurality of first battery cells 10, and here, the heat transfer medium may also be referred to as a cooling medium or a cooling fluid, more specifically, a coolant or a cooling gas. Optionally, the heat transfer medium may be water, a mixture liquid of water and ethylene glycol, a conduction oil, a coolant, air, or the like.

Optionally, the heat exchange flow channel may have an inlet and an outlet, so as to realize flowing of the heat exchange medium to increase the heat exchange efficiency.

In some embodiments of the present application, a first side wall 111 of at least a first battery cell 10 is thermally connected to the insert 110.

In the above technical solution, by disposing the insert 110 thermally connected to the first side wall 111 of the at least a first battery cell 10, it is easy to increase the heat exchange area between the insert 110 and the corresponding first battery cell 10 to increase the heat transfer efficiency between the insert 110 and the first battery cell 10, increasing a temperature control effect for the battery 200; and, the insert 110 can enhance, to some extent, the first side wall 111 of the corresponding first battery cell 10 to increase its deformation resistance ability, so it is easy to reduce the probability of problems, such as local lithium plating, thermal runaway, etc., easily caused by uneven force-loading to the first battery cell 10.

According to some embodiments of the present application, the present application also provides an electric device 1000, including the battery 200 described in any one of the above solutions, and the battery 200 is used to provide electrical energy for the electric device 1000.

The electric device 1000 may be any one of the above apparatus or systems using the battery 2000.

According to some embodiments of the present application, a battery 200 is provided, the battery 200 includes a box 30 and at least one battery unit 10A arranged in the box 30, and the battery unit 10A includes a plurality of first battery cells 10.

Here, each first battery cell 10 is disposed opposite to at least one first side wall 111 and at least one second side wall 112 in a plurality of adjacent first battery cells 10, and two oppositely disposed first side walls 111 of adjacent first battery cells 10 are disposed in a staggered manner. This design makes a smaller contact area of two adjacent first battery cells 10 and an incompletely blocked first side wall 111, thus in a process of using the battery 200 by charging or discharging, the first battery cell 10 can diffuse heat faster through the first side wall 111 having the largest area to reduce a temperature rise of the battery 200, and when a certain first battery cell 10 is subjected to thermal runaway, heat diffusion between two adjacent first battery cells 10 can be reduced, thereby increasing the performance and use safety of the battery 2000.

Finally, it should be noted that the above embodiments are only for the purpose of illustrating the technical solutions of the present application and are not to be construed as limiting the present application. Although the present application has been described in detail with reference to the above embodiments, it should be understood by a person of ordinary skill in the art that modifications may be made to the technical solutions described in the above embodiments, or equivalent replacement may be made to some or all of the technical features thereof. However, the modifications or replacements do not make the nature of corresponding technical solutions depart from the scope of the technical solutions of the embodiments of the present application, all of which shall fall within the scope of the claims and the description of the present application. In particular, the technical features mentioned in the embodiments may be combined in any manner provided that there is no structural conflict. The present application is not limited to the specific embodiments disclosed herein, but includes all technical solutions falling within the scope of the claims.

What is claimed is:

1. A battery, wherein the battery comprises a plurality of rows of battery units, each row of the plurality of rows comprises:

a plurality of first battery cells, each of the plurality of first battery cells comprises a plurality of side walls, the plurality of side walls comprise a first side wall and a second side wall connected to each other and forming an included angle, the first side wall is the side wall of the first battery cell having the largest area, the plurality of first battery cells comprise three first battery cells, the three first battery cells comprise a middle battery cell and two adjacent battery cells, the middle battery cell is disposed between and connected to the two adjacent battery cells, one second side wall of the middle battery cell is directly opposite to and in direct contact with one first side wall of one of the two adjacent battery cells, one first side wall of the middle battery cell is directly opposite to and in direct contact with one second side wall of the other one of the two adjacent battery cells, wherein, any two adjacent first battery cells in one row of the plurality of rows are disposed in an intersected manner to define an opening space, two of the first battery cells disposed in the intersected manner in another row of first battery cells are disposed within the opening space, the second side wall of one of the first battery cells disposed in the intersected manner is parallel to the first side wall of the other first battery cell disposed in the intersected manner.

2. The battery according to claim 1, wherein adjacent first battery cells are in thermal connection.

3. The battery according to claim 1, wherein two of the first battery cells at row ends of adjacent rows are electrically connected by a busbar, and at least a part of the busbar is obliquely disposed relative to the first side walls of the two first battery cells.

4. The battery according to claim 3, wherein the busbar comprises a transition portion and two electrical connection portions, two ends of the transition portion are connected to the two electrical connection portions, respectively, an extension direction of the transition portion forms an included angle with both the first side walls and the second side walls of the two first battery cells, and the two electrical connection portions are electrically connected to the two first battery cells, respectively.

5. The battery according to claim 4, wherein the transition portion is provided with a stretch-deformable buffer portion.

6. The battery according to claim 5, wherein the stretch-deformable buffer portion is connected between each electrical connection portion and the transition portion.

7. The battery according to claim 5, wherein the stretch-deformable buffer portion comprises at least one bending portion having an opening.

8. The battery according to claim 4, wherein the transition portion is provided with a stiffener which is a conductive-material member.

9. The battery according to claim 8, wherein the transition portion and the stiffener are disposed in a stacked manner.

10. The battery according to claim 1, wherein the battery comprises a box, the plurality of rows of battery units are disposed in the box, gaps are disposed between the plurality of rows of battery units and an inner wall of the box, and the gaps are filled with a filler.

11. The battery according to claim 10, wherein the filler comprises a thermally-conductive member, the thermally-conductive member being thermally connected to the box and at least one first side wall and/or second side wall.

12. The battery according to claim 11, wherein the filler comprises a monitor for detecting an operating state of each first battery cell.

13. The battery according to claim 10, wherein the filler comprises a second battery cell electrically connected to at least one first battery cell.

14. The battery according to claim 13, wherein the second battery cell is a cylindrical battery.

15. The battery according to claim 14, wherein there are a plurality of second battery cells, and the plurality of second battery cells and the plurality of first battery cells are arranged into a rectangular battery module.

16. An electric device, comprising the battery according to claim 1, the battery being used to provide electric energy.

17. The battery according to claim 15, wherein more than one second battery cells of the plurality of second battery cells are disposed in the opening space defined by two adjacent first battery cells of an outermost row of the plurality of rows, and the more than one second battery cells are electrically connected in series.

18. The battery according to claim 10, further comprising a thermally-conductive stiffener, at least one of the first battery cells is thermally connected to the thermally-conductive stiffener, and the thermally-conductive stiffener is thermally connected to the box.

19. The battery according to claim 18, wherein a cavity is disposed in the thermally-conductive stiffener, and the cavity is configured to be deformable to buffer stress when the thermally-conductive stiffener is pressed.

20. The battery according to claim 1, further comprising a heat exchange plate and a thermally-conductive insert, the heat exchange plate is located at lower sides of the first battery cells along a height direction of the first battery cells, the thermally-conductive insert is disposed at a surface of the heat exchange plate close to the first battery cells and is thermally connected to at least one of the first battery cells.

* * * * *